US012494721B2

(12) United States Patent
Kawamura

(10) Patent No.: US 12,494,721 B2
(45) Date of Patent: Dec. 9, 2025

(54) POWER CONVERSION DEVICE WITH BYPASS OF A GATE CURRENT

(71) Applicant: Mitsubishi Electric Corporation, Tokyo (JP)

(72) Inventor: Mao Kawamura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 315 days.

(21) Appl. No.: 17/987,414

(22) Filed: Nov. 15, 2022

(65) Prior Publication Data

US 2023/0198424 A1 Jun. 22, 2023

(30) Foreign Application Priority Data

Dec. 16, 2021 (JP) ................................ 2021-203790

(51) Int. Cl.
*H02M 1/088* (2006.01)
*H02M 1/32* (2007.01)
*H02M 7/5387* (2007.01)

(52) U.S. Cl.
CPC ....... *H02M 7/53871* (2013.01); *H02M 1/088* (2013.01); *H02M 1/32* (2013.01)

(58) Field of Classification Search
CPC ............................................... H02M 1/08–088
See application file for complete search history.

(56) References Cited

U.S. PATENT DOCUMENTS 9,813,009 B1 * 11/2017 Xu ....................... H03K 17/168
2017/0005652 A1 * 1/2017 Hatano ................ H03K 17/165

FOREIGN PATENT DOCUMENTS

CN 1424822 A * 6/2003 ......... H01L 29/7803
JP 2020-156304 A 9/2020

OTHER PUBLICATIONS

Machien trnaslation of CN1424822A (Year: 2003).*

* cited by examiner

*Primary Examiner* — Peter M Novak
(74) *Attorney, Agent, or Firm* — Sughrue Mion, PLLC

(57) ABSTRACT

The power conversion device includes: a control unit that switches between the on state in which a power module is made conductive between a drain terminal and a source terminal of the power module and the off state in which the power module is made non-conductive; a resistance element connected between the control unit and a gate terminal of the power module; and a bypass circuit in which a drain terminal of a semiconductor switching element provided for each power module is connected to the gate terminal of the power module, and a source terminal of the semiconductor switching element is connected to the source terminal of the power module, in which the control unit switches the semiconductor switching element of the bypass circuit to the on state when the power module is switched to the off state, thereby reducing occurrence of an erroneous turn-on of the power module.

12 Claims, 28 Drawing Sheets

POWER CONVERSION DEVICE WITH BYPASS OF A GATE CURRENT

CROSS-REFERENCE TO RELATED APPLICATION(S)

This application claims benefit of priority under 35 USC § 119 (b) to JP 2021-203790filed in the Japanese Patent Office on Dec. 16, 2021.

TECHNICAL FIELD

The present disclosure relates to a power conversion device.

BACKGROUND ART

A power conversion device used in an electric power train is configured by connecting a plurality of power modules together in parallel such as an insulated gate bipolar transistor (IGBT) or a metal oxide semiconductor field effect transistor (MOSFET). By simultaneously switching these power modules, power capacity of the power conversion device is increased.

Note that, due to a characteristic difference between the power modules or a variation in inductance of a main circuit or a control circuit of the power conversion device, switching timing may deviate between the power modules. If there is a deviation in switching timing between the power modules, a current imbalance due to this occurs. For example, when a current concentrates on the power module that has switched earliest, a loss may increase and the power module may be destroyed.

In addition, in the power conversion device, when a deviation occurs in switching timing between the power modules, a potential difference occurs due to the deviation. The potential difference between the power modules causes a resonance phenomenon due to an inductance between the power modules and a parasitic capacitance thereof and an inductance component of a control line (for example, a gate line or a source line of a transistor that is a power module). When a voltage increase due to the resonance phenomenon is superimposed on the gate voltage, erroneous turn-on (Hereinafter, it is described as erroneous on.) of the transistor may be induced, and the power module may be destroyed. In particular, this defect is noticeable when the transistor is switched at a high speed.

To solve the above-described defect, a power conversion device has been devised that suppresses a deviation in switching timing between power modules that causes the resonance phenomenon between the power modules. For example, a power conversion device described in Patent Literature 1 includes semiconductor modules connected together in parallel, a gate drive circuit that drives the semiconductor modules, and a gate wiring line that is provided in each of the semiconductor modules and connects each semiconductor module and the gate drive circuit or another of the semiconductor modules. In the power conversion device, the semiconductor module having a lower gate threshold voltage is connected to the gate drive circuit or the other semiconductor modules by the gate wiring line having a lower impedance, whereby the gate current value supplied to each semiconductor module is controlled to be the same value in an off operation.

CITATION LIST

Patent Literature

Patent Literature 1: JP 2020-156304 A

SUMMARY OF INVENTION

Technical Problem

The power conversion device described in Patent Literature 1 can reduce the deviation in the switching timing between the power modules. However, in the power conversion device, even if switching timings are equal between the power modules, if the impedance of a main circuit of each power module varies, a timing at which a recovery current is generated differs in each phase. For this reason, for example, a voltage difference occurs in a drain-source voltage Vds of a transistor that is a semiconductor switching element. There has been a problem that the gate voltage increases, the erroneous on is caused, and the power module fails when a part of a resonance current generated between the power modules due to the voltage difference of the drain-source voltage Vds flows around the gate line.

The present disclosure solves the problem described above, and an object of the present disclosure is to obtain a power conversion device that can suppress the erroneous on due to resonance of power modules.

Solution to Problem

A power conversion device according to the present disclosure is a power conversion device including a plurality of power modules connected together in parallel. The power conversion device includes: a controller to switch between an on state in which a terminal pair of each of the power modules is made conductive and an off state in which the terminal pair of each of the power modules is made non-conductive, by supplying a control signal to a control terminal, of the control terminal and the terminal pair of each of the power modules; a resistance element connected between the controller and the control terminal of each of the power modules; and a bypass circuit including a semiconductor switching element for each of the power modules. One terminal of a terminal pair of the semiconductor switching element is connected to a control terminal of a corresponding one of the power modules and another terminal of the terminal pair of the semiconductor switching element is connected to one terminal of the terminal pair of the corresponding one of the power modules. The controller switches the semiconductor switching element of the bypass circuit to an on state when the corresponding one of the power modules is switched to the off state.

Advantageous Effects of Invention

According to the present disclosure, when the power module is switched to the off state, the semiconductor switching element of the bypass circuit is switched to the on state, so that the bypass circuit reduces the resonance current flowing through the control terminal of the power module. As a result, the power conversion device according to the present disclosure can suppress the erroneous on due to the resonance of the power modules.

BRIEF DESCRIPTION OF DRAWINGS

FIG. 5 is a partial circuit diagram illustrating a state in which one of the two power module groups included in the conventional power conversion device is on.

DESCRIPTION OF EMBODIMENTS

First Embodiment

Figure 1:
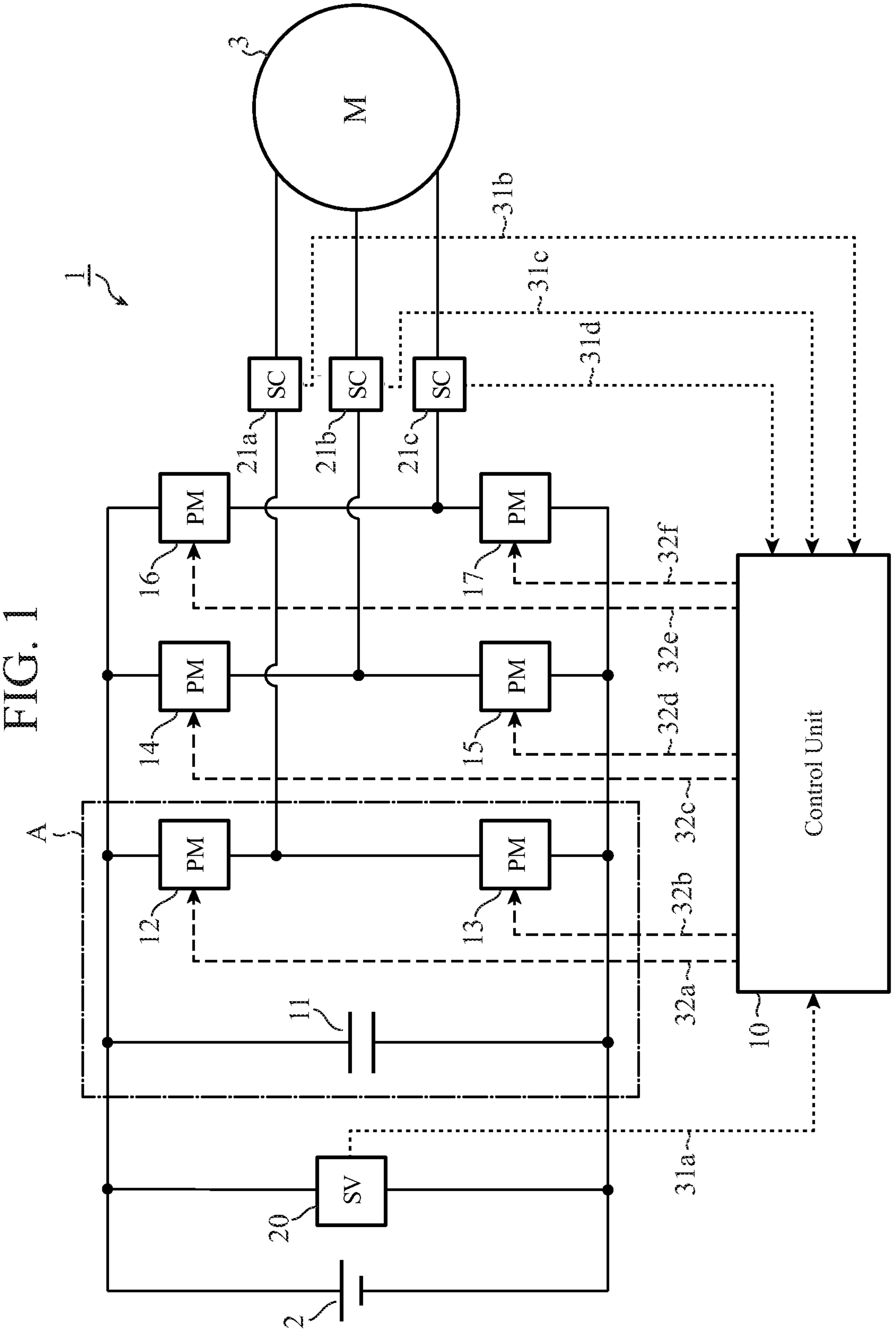
FIG. 1 is a schematic configuration diagram illustrating a power conversion device according to a first embodiment.

FIG. 1 is a schematic configuration diagram illustrating a power conversion device 1 according to a first embodiment. In FIG. 1, the power conversion device 1 is an inverter circuit. A DC input power supply 2 is connected to an input stage of the power conversion device 1, and a motor 3 as a load is connected to an output stage. The DC input power supply 2 is a DC storage battery that is a battery, and outputs a DC voltage. In a case where the power conversion device 1 is an inverter circuit applied to an electric vehicle or a hybrid vehicle, a secondary battery such as a nickel-metal hydride battery or a lithium ion battery is used as the DC input power supply 2, and for example, a voltage of greater than or equal to 100 V is output.

As illustrated in FIG. 1, the power conversion device 1 is a three-phase inverter circuit including a smoothing capacitor 11 at the input stage and including six power module groups 12 to 17 (PMs 12 to 17 in FIG. 1), and outputs an output voltage from which voltage ripples and noise have been removed by the smoothing capacitor 11 to three-phase output terminals Vu, Vv, and Vw as three-phase AC. The three-phase AC is supplied from the output terminals Vu, Vv, and Vw to the motor 3. The motor 3 is, for example, a motor included in a generator or an electric motor. A control unit 10 outputs control signals to the power module groups 12 to 17 through control lines 32*a* to 32*f*, and performs on-off control with a predetermined dead time.

For example, the power module group 12 is supplied with a control signal from the control unit 10 through the control line 32*a* and performs switching operation. Switching of the power module group 12 is operation of applying a control voltage to a control terminal (for example, a gate terminal) included in a semiconductor switching element that is a power module in the power module group 12, to switch between an on state in which a terminal pair (for example, a pair of a source terminal and a drain terminal) included in the semiconductor switching element is conductive and an off state in which the terminal pair is non-conductive.

The power module group 13 is supplied with a control signal from the control unit 10 through the control line 32*b* and performs switching operation. The power module group 14 is supplied with a control signal from the control unit 10 through the control line 32*c* and performs switching operation. The power module group 15 is supplied with a control signal from the control unit 10 through the control line 32*d* and performs switching operation. The power module group 16 is supplied with a control signal from the control unit 10 through the control line 32*e* and performs switching operation. The power module group 17 is supplied with a control signal from the control unit 10 through the control line 32*f* and performs switching operation.

A voltage sensor circuit 20 (SV 20 in FIG. 1) is a circuit that is connected in parallel with the smoothing capacitor 11 at the input stage of the power conversion device 1 and detects the DC voltage from the DC input power supply 2. The control unit 10 acquires DC voltage information detected by the voltage sensor circuit 20 through a signal line 31*a*. In addition, current sensor circuits 21*a* to 21*c* (SCs 21*a* to 21*c* in FIG. 1) are provided corresponding to the respective phases, in the output stages from the output terminals Vu, Vv, and Vw to the motor 3. The current sensor circuit 21*a* detects an AC current Iu between the output terminal Vu and the motor 3, of the three-phase AC. The current sensor circuit 21*b* detects an AC current Iv between the output terminal Vv and the motor 3. The current sensor circuit 21*c* detects an AC current Iw between the output terminal Vw and the motor 3.

The control unit 10 acquires AC current information detected by the current sensor circuit 21*a* through a signal line 31*b*, acquires AC current information detected by the current sensor circuit 21*b* through a signal line 31*c*, and acquires AC current information detected by the current sensor circuit 21*c* through a signal line 31*d*.

Note that the control unit 10 is connected to a rotation angle sensor and a motor control device (not illustrated in FIG. 1) via signal lines. The control unit 10 acquires rotation angle information of the motor 3 detected by the rotation angle sensor through a signal line, and acquires a torque command value and a DC voltage command value from the motor control device through a signal line. The control unit 10 controls the switching operation of the power module groups 12 to 17 on the basis of the acquired information.

A plurality of power modules constituting the power module group 12 to 17 is a semiconductor switching element, and for example, a MOSFET is used. Note that a power module including an IGBT and a diode D1 may be used. In the following description, it is assumed that a power module included in a power conversion device is a MOSFET.

Figure 2:
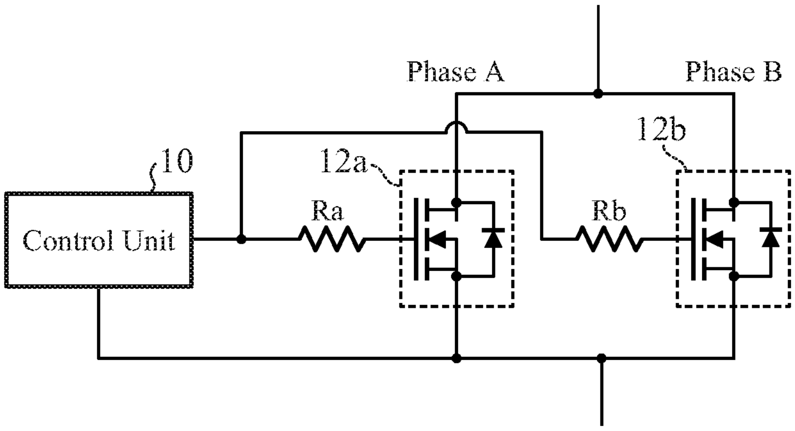
FIG. 2 is a partial circuit diagram illustrating a configuration of a power module group.

FIG. 2 is a partial circuit diagram illustrating a configuration of the power module group 12, and illustrates a configuration of a general power module group in a conventional power conversion device. The general power module group includes a plurality of power modules. The power module group 12 illustrated in FIG. 2 is configured by connecting power modules 12*a* and 12*b* together in parallel. The power modules 12*a* and 12*b* each have a drain terminal and a source terminal that are a terminal pair, and drain terminals are connected to each other and the source terminals are connected to each other.

The control unit 10 functions as a gate driver circuit. The control unit 10 is connected to a gate terminal that is a control terminal of the power module 12*a* via a gate resistance Ra that is a resistance element, and is connected to a gate terminal of the power module 12*b* via a gate resistance Rb that is a resistance element. In FIG. 2, the power module 12*a* on the left side is referred to as a phase A, and the power module 12*b* on the right side is referred to as a phase B.

In the power module group 12, when there is a variation in switching operation between the power module 12*a* and the power module 12*b* or there is a variation in inductance, a potential difference is generated between the power module 12*a* and the power module 12*b*. When resonance occurs between the power module 12*a* and the power module 12*b* due to the potential difference, and a voltage generated by the resonance is applied to the gate terminal, and the voltage applied to the gate terminal exceeds the threshold voltage Vth, the power module is erroneously turned on.

Next, a problem in the conventional power conversion device will be described in detail.

Figure 3:
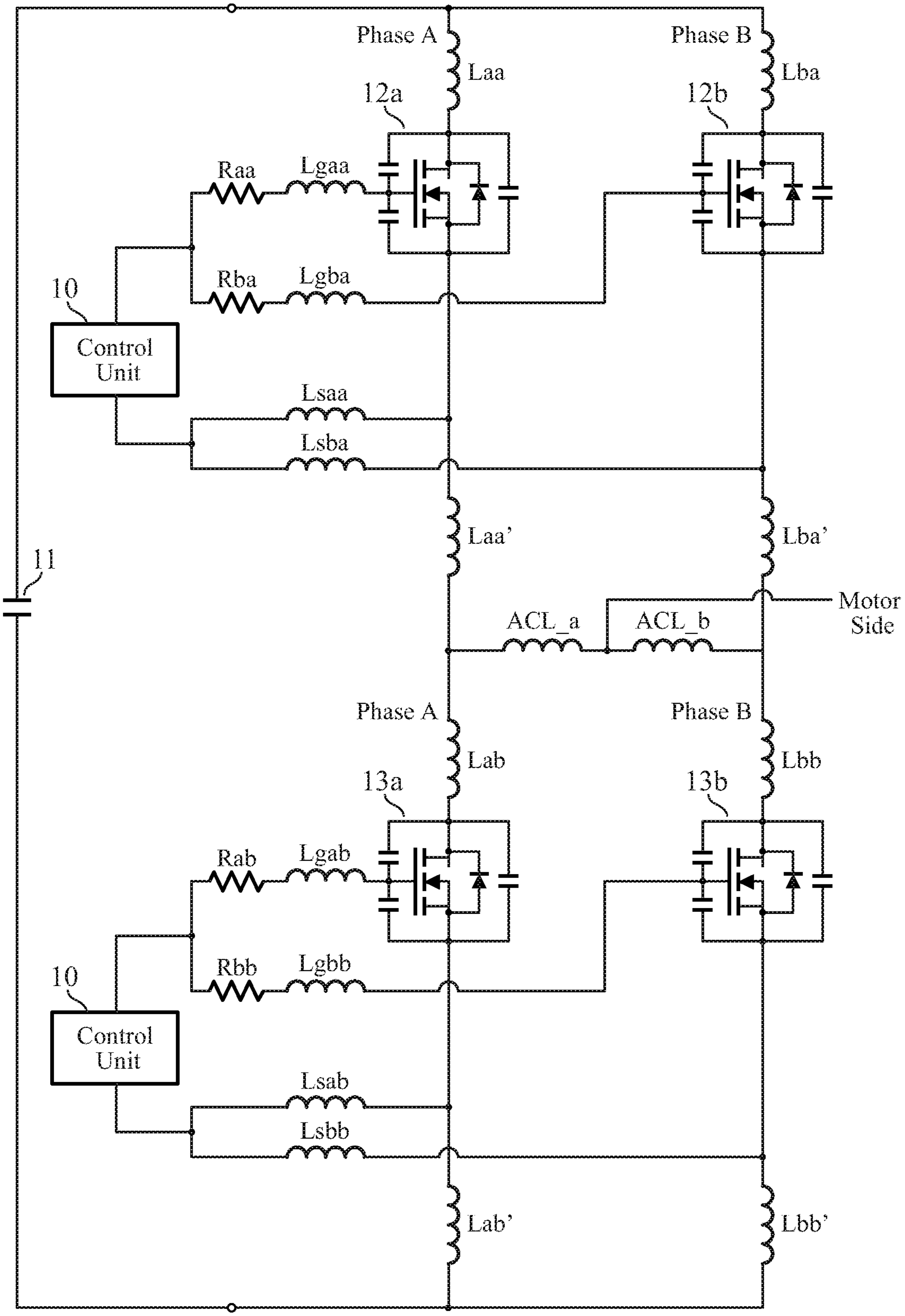
FIG. 3 is a partial circuit diagram illustrating a configuration of two power module groups included in a conventional power conversion device.

FIG. 3 is a partial circuit diagram illustrating a configuration of two power module groups included in the conventional power conversion device, and illustrates a portion A surrounded by a one-dot chain line in FIG. 1. In FIG. 3, the power modules 12*a* and 13*a* on the left side are defined as the phase A, and the power modules 12*b* and 13*b* on the right side are defined as the phase B. In addition, the power modules 12*a* and 12*b* are power modules on an upper arm side, and the power modules 13*a* and 13*b* are power modules on a lower arm side.

As illustrated in FIG. 3, parasitic capacitances exist between the drain and source, between the drain and gate, and between the gate and source of the power modules 12*a*, 12*b*, 13*a*, and 13*b*.

In the power module group 12, the control unit 10 is connected to the gate terminal of the power module 12*a* via a gate resistance Raa, and is connected to the gate terminal of the power module 12*b* via a gate resistance Rba. In the power module group 13, the control unit 10 is connected to a gate terminal of the power module 13*a* via a gate resistance Rab, and is connected to a gate terminal of the power module 13*b* via a gate resistance Rbb.

On the upper arm side, an inductance component Lgaa exists in a gate line from the gate resistance Raa to the gate terminal of the power module 12*a*. In addition, an inductance component Lgba exists in a gate line from the gate resistance Rba to the gate terminal of the power module 12*b*.

An inductance component Lsaa exists in a control source line from the control unit 10 to the source terminal of the power module 12*a*, and an inductance component Lsba exists in a control source line from the control unit 10 to the source terminal of the power module 12*b*.

An inductance component Laa exists in a wiring line from the smoothing capacitor 11 to the drain terminal of the power module 12*a*. An inductance component Lba exists in a wiring line from the smoothing capacitor 11 to the drain terminal of the power module 12*b*. In addition, an inductance component Laa' exists in a wiring line connected to the source terminal of the power module 12*a*. An inductance component Lba' exists in a wiring line connected to the source terminal of the power module 12*b*.

On the lower arm side, an inductance component Lgab exists in a gate line from the gate resistance Rab to the gate terminal of the power module 13*a*. In addition, an inductance component Lgbb exists in a gate line from the gate resistance Rbb to the gate terminal of the power module 13*b*. An inductance component Lsab exists in a control source line from the control unit 10 to a source terminal of the power module 13*a*, and an inductance component Lsbb exists in a control source line from the control unit 10 to a source terminal of the power module 13*b*.

An inductance component Lab exists in a wiring line from the middle point (connection point) between the lower arm side and the upper arm side to a drain terminal of the power module 13*a*. An inductance component Lbb exists in a wiring line from the middle point (connection point) between the lower arm side and the upper arm side to a drain terminal of the power module 13*b*. In addition, an inductance component Lab' exists in a wiring line connected to the source terminal of the power module 13*a*. An inductance component Lbb' exists in a wiring line connected to the source terminal of the power module 13*b*.

In a wiring line connecting the source terminal of the power module 12*a* and the source terminal of the power module 12*b* together on the upper arm side, an inductance component ACL_a exists in a wiring line portion from a connection point with the drain terminal of the power module 13*a* on the lower arm side to a connection point with a wiring line connected to the motor 3. In addition, in the wiring line connecting the source terminal of the power module 12*a* and the source terminal of the power module 12*b* together on the upper arm side, an inductance component ACL_b exists in a wiring line portion from the connection point with the wiring line connected to the motor 3 to a connection point with the drain terminal of the power module 13*b* on the lower arm side.

Note that the above-described inductance components are a parasitic inductance components generated in the wiring line.

Figure 4:
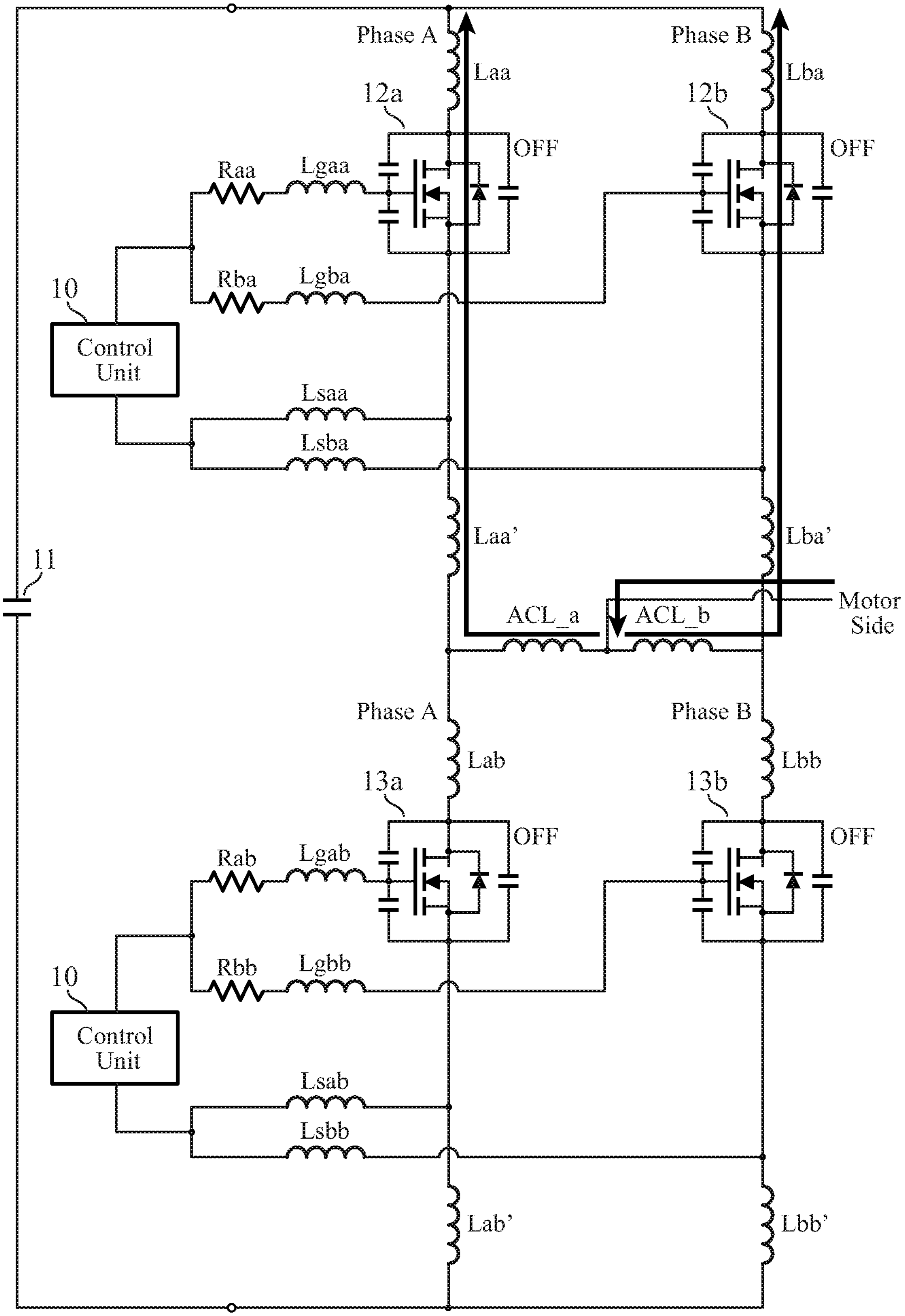
FIG. 4 is a partial circuit diagram illustrating a state in which the two power module groups included in the conventional power conversion device are both off

Next, a mechanism will be described in which resonance occurs in the power modules 12*a* and 12*b* on the upper arm side when the power modules 13*a* and 13*b* on the lower arm side are set to the on state. FIG. 4 is a partial circuit diagram illustrating a state in which the two power module groups 12 and 13 included in the conventional power conversion device are both off, and illustrates the circuit illustrated in FIG. 3. In FIG. 4, a set of the power modules 12*a* and 12*b* and a set of the power modules 13*a* and 13*b* are both in the off state. At this time, as indicated by an arrow in FIG. 4, a current from the motor 3 side flows into the wiring line connecting the source terminal of the power module 12*a* and the source terminal of the power module 12*b* together. As illustrated in FIG. 4, the current flows from the source terminal side to the drain terminal side via internal diodes included in the power modules 12*a* and 12*b*.

Figure 5:
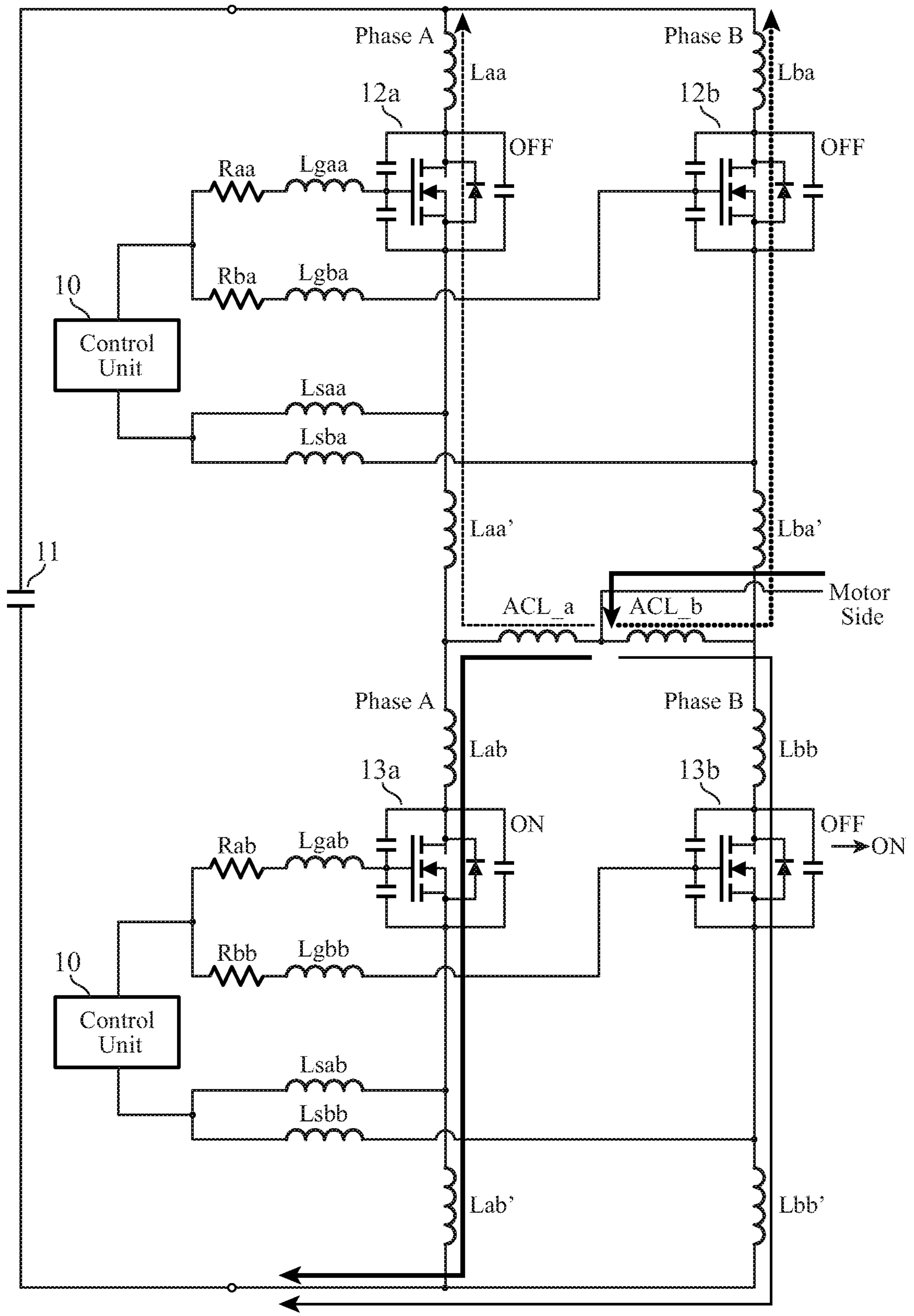

FIG. 5 is a partial circuit diagram illustrating a state in which one of the two power module groups 12 and 13 included in the conventional power conversion device is on, and illustrates a state in which the power module group 13 is turned on in the circuit illustrated in FIG. 3. In FIG. 5, the current flowing from the motor 3 side flows through the drain terminals of the power modules 13*a* and 13*b* being in the on state, and is the current flowing through the internal diodes of the power modules 12*a* and 12*b* being in the off state.

Here, it is assumed that a timing at which the power module 13*a* is turned on is earlier and the power module 13*b* is turned on later when the power module group 13 is turned on. In this case, a drain current flowing into the drain terminal of the power module 13*a* is larger than a drain current (thin arrow) flowing into the drain terminal of the power module 13*b* as indicated by a thick arrow in FIG. 5.

On the other hand, a current flowing through the internal diode of the power module 12*a* connected to the power module 13*a* via the source terminal is smaller than a current (dashed arrow) flowing through the internal diode of the power module 12*b* as indicated by a thin dashed arrow. For this reason, the current flowing through the internal diode of the power module 12*a* first becomes 0, and reverse recovery (recovery) occurs in the internal diode.

Figure 6:
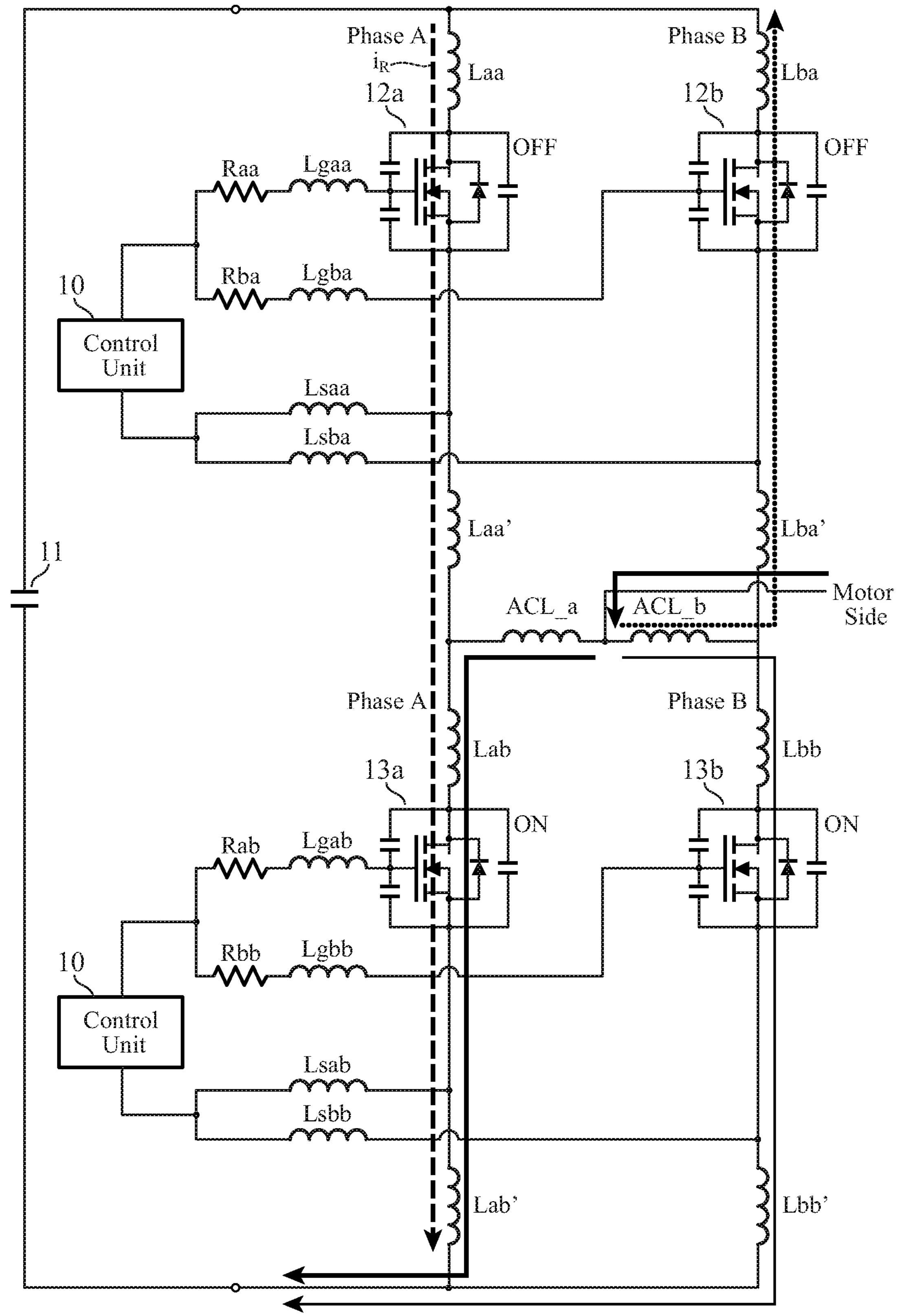
FIG. 6 is a partial circuit diagram illustrating a state in which a recovery current flows through a phase A of the two power module groups included in the conventional power conversion device.

FIG. 6 is a partial circuit diagram illustrating a state in which a recovery current flows through the phase A of the two power module groups 12 and 13 included in the conventional power conversion device, and illustrates a state in which a recovery current $i_R$ flows through the phase A in the circuit illustrated in FIG. 3. When the recovery occurs in the internal diode of the power module 12*a*, the recovery current $i_R$ flows through the phase A side as indicated by a thick dashed arrow. At this time, the recovery does not occur in the internal diodes of the power modules 12*b* and 13*b* on the phase B side, and the internal diode of the power module 12*b* is in a conductive state.

Figure 7:
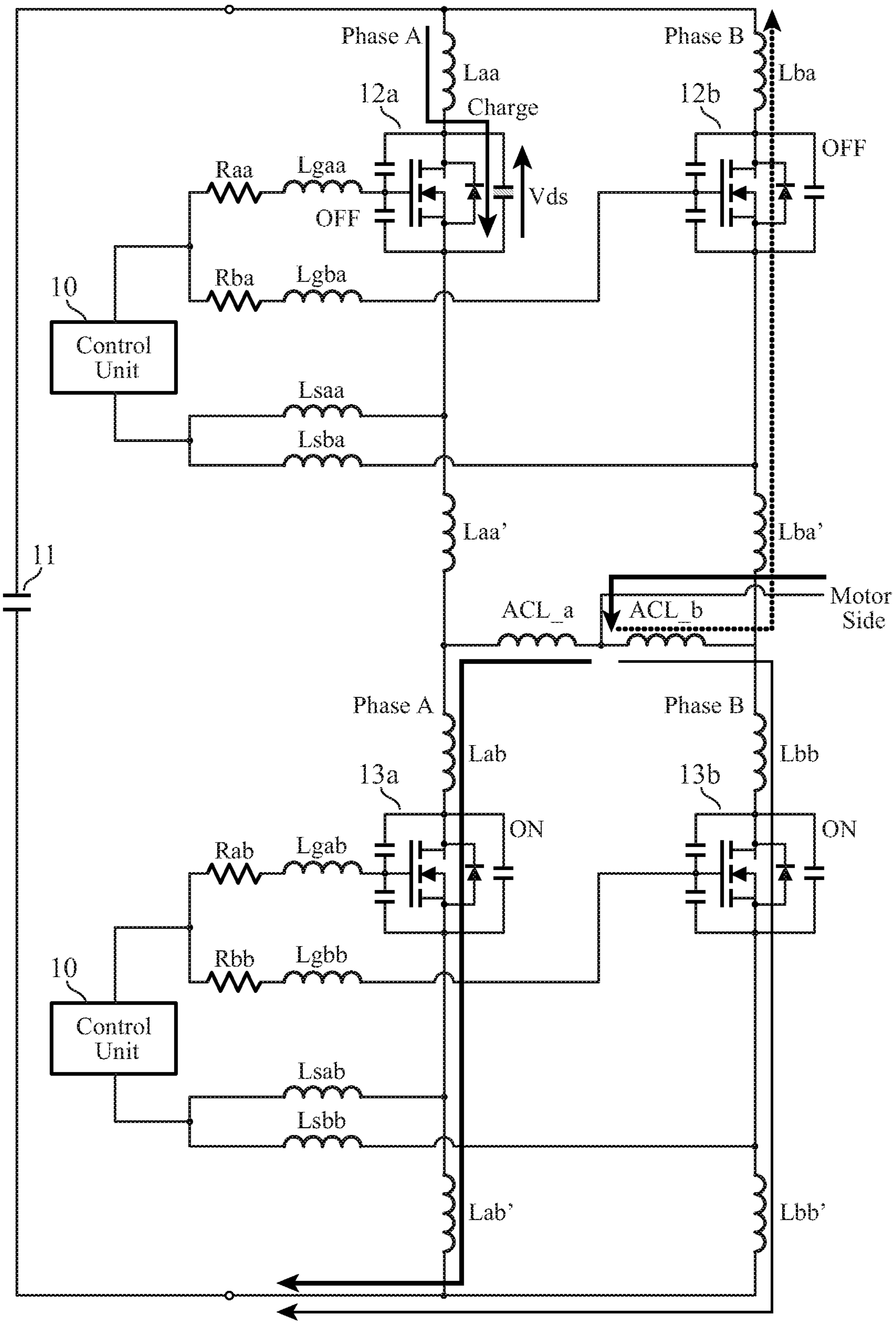
FIG. 7 is a partial circuit diagram illustrating a state in which a potential difference is generated between power modules on a phase A side and power modules on a phase B side in the two power module groups included in the conventional power conversion device.

FIG. 7 is a partial circuit diagram illustrating a state in which a potential difference is generated between the power modules 12*a* and 13*a* on the phase A side and the power modules 12*b* and 13*b* on the phase B side in the two power module groups 12 and 13 included in the conventional power conversion device. After the recovery of the internal diode of the power module 12*a* occurs, as illustrated in FIG. 7, the parasitic capacitance between the drain and the source of the power module 12*a* is charged, and a drain-source voltage Vds increases.

On the other hand, since the internal diode of the power module 12*b* is in the conductive state, the drain-source voltage Vds is substantially 0 V. At this time, the potential difference is generated between the power module 12*a* of the phase A and the power module 12*b* of the phase B. In FIG. 7, the drain-source voltage Vds of the power module 12*a* is higher than the drain-source voltage Vds of the power module 12*b*.

Figure 8:
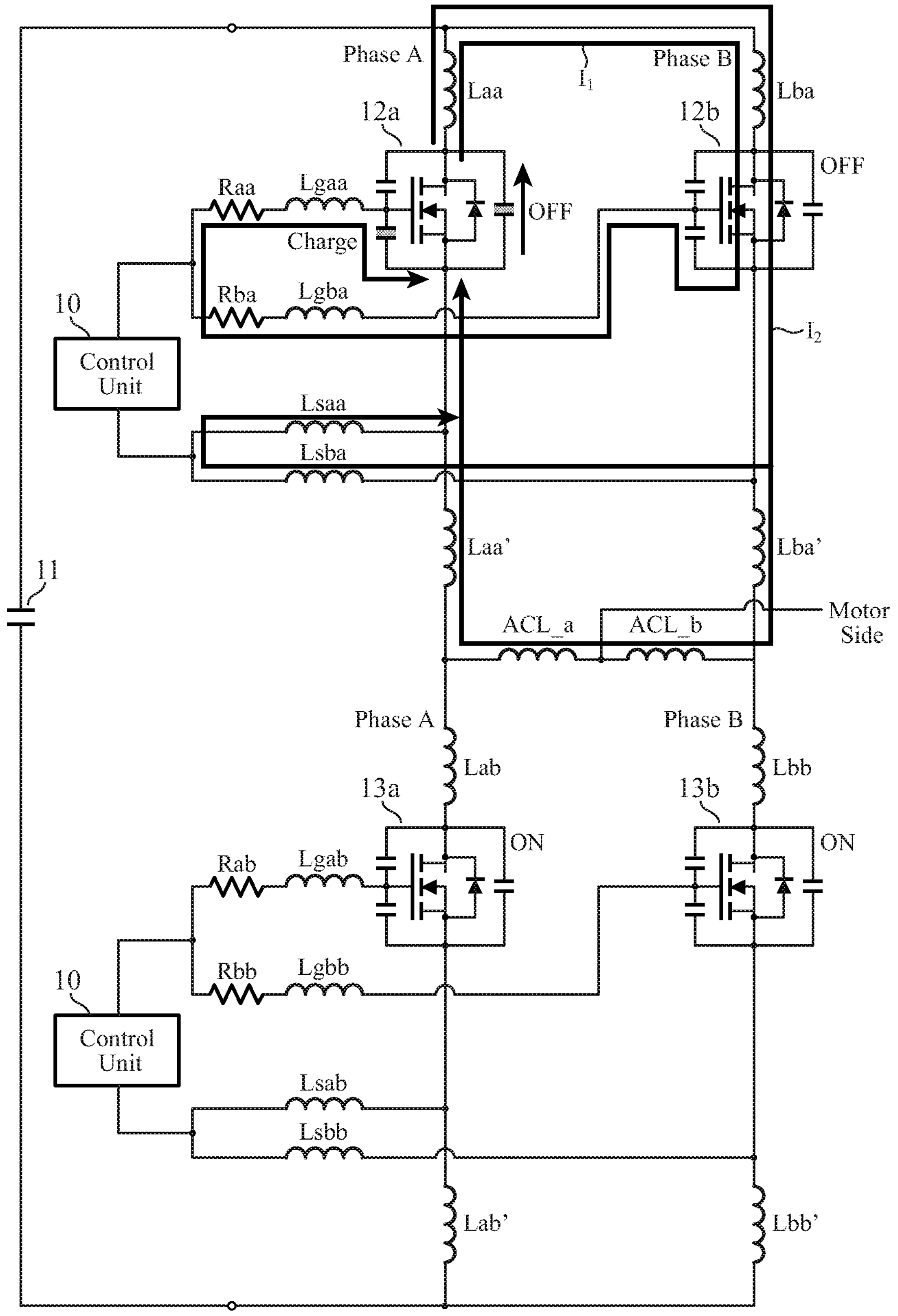
FIG. 8 is a partial circuit diagram illustrating a state in which currents flow from the phase A to the phase B due to the potential difference generated between the power module on the phase A side and the power module on the phase B side in the power module group included in the conventional power conversion device.

FIG. 8 is a partial circuit diagram illustrating a state in which currents $I_1$ and $I_2$ flow from the phase A to the phase B due to a potential difference generated between the power module 12*a* on the phase A side and the power module 12*b* on the phase B side in the power module group 12 included in the conventional power conversion device. In the power module group 12, when the drain-source voltage Vds of the power module 12*a* becomes larger than the drain-source voltage Vds of the power module 12*b* and the potential difference is generated, the currents $I_1$ and $I_2$ flow from the power module 12*a* of the phase A to the power module 12*b* of the phase B.

As indicated by an arrow in FIG. 8, the current $I_1$ flows from the drain terminal of the power module 12*a* to both gate lines through the internal diode of the power module 12*b*, which is in the conductive state. As indicated by an arrow in FIG. 8, the current $I_2$ flows from the drain terminal of the power module 12*a* to a line on the source side, that is, the wiring line connecting the source terminal of the power module 12*a* and the source terminal of the power module 12*b* together, through the internal diode of the power module 12*b*, which is in the conductive state. Note that, a description of a turn-on current flowing through the power module group 13 is omitted.

Figure 9:
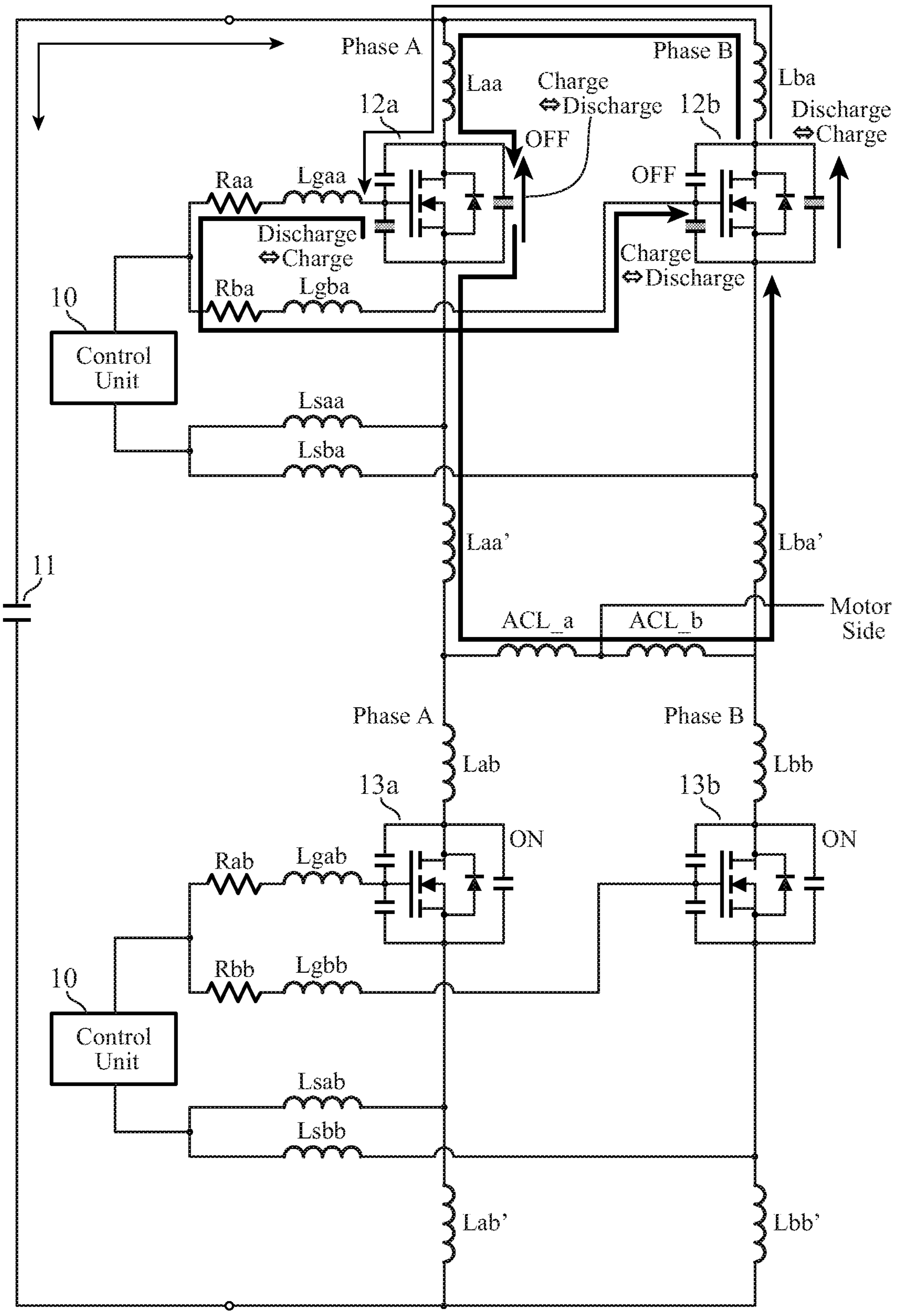
FIG. 9 is a partial circuit diagram illustrating a state in which power modules in the power module group included in the conventional power conversion device resonate between parasitic capacitances.
Figure 10A:
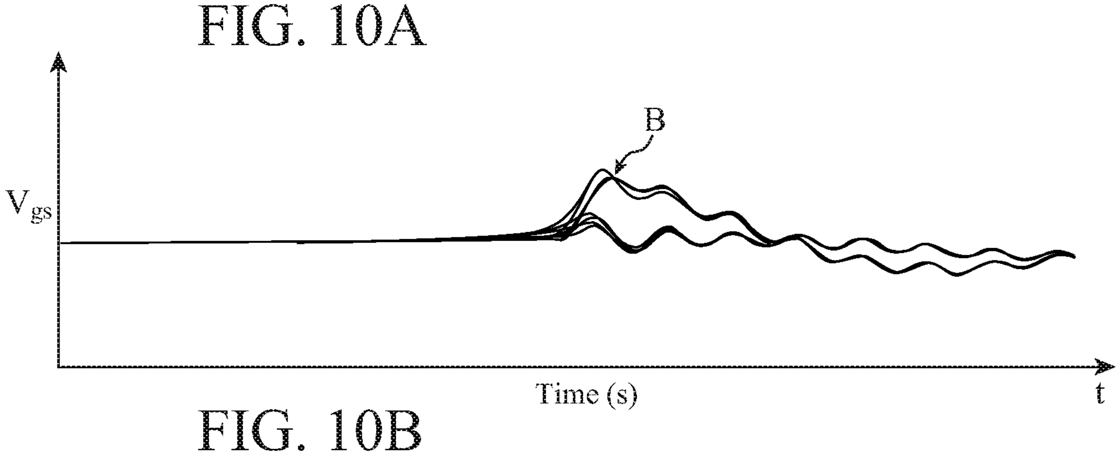
FIGS. 10A-10D are voltage waveform diagrams illustrating temporal changes of voltages in the two power module groups included in the conventional power conversion device.
Figure 10B:
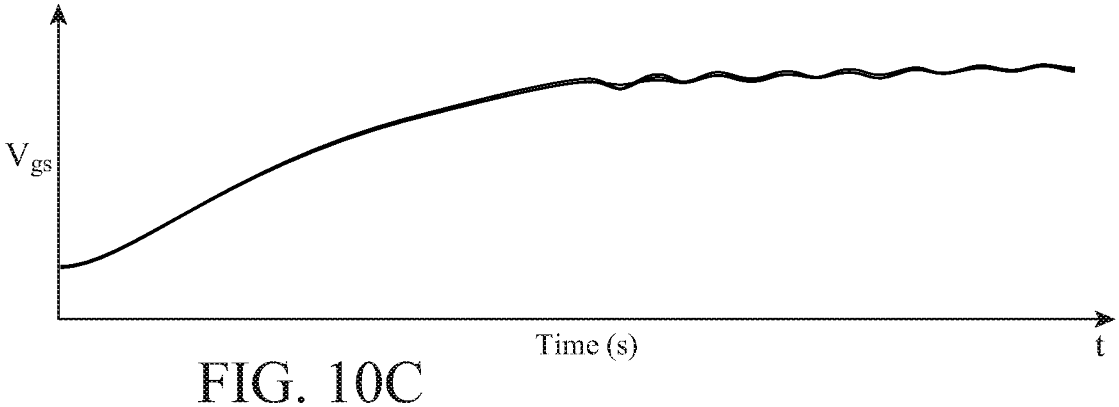
Figure 10C:
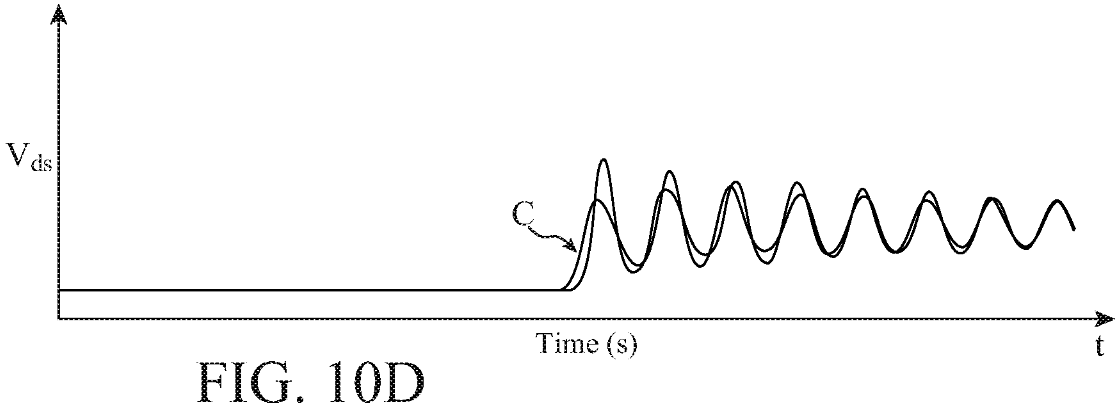
Figure 10D:
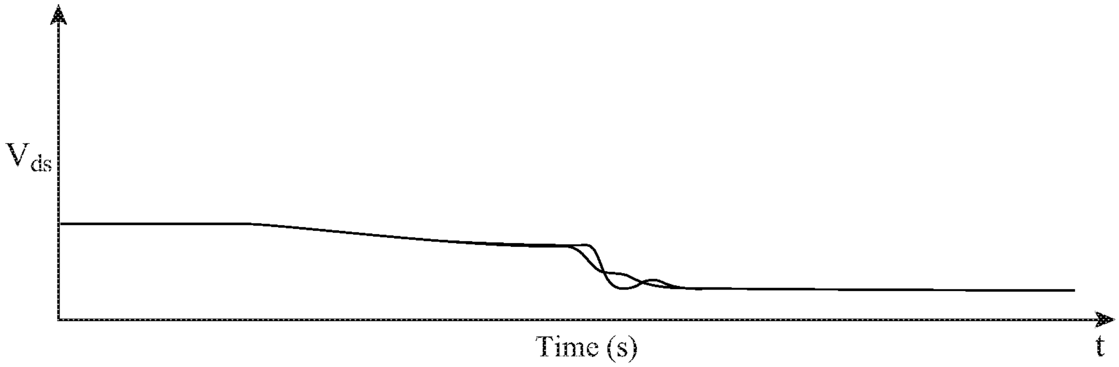

FIG. 9 is a partial circuit diagram illustrating a state in which the power modules 12*a* and 12*b* in the power module group 12 included in the conventional power conversion device resonate between the parasitic capacitances. When the recovery of the internal diode of the power module 12*b* is completed, the parasitic capacitance starts to be formed in the power module 12*b*, and a current flowing immediately before through the internal diode charges the parasitic capacitance as illustrated in FIG. 9. Thereafter, charging and discharging are alternately performed between the parasitic capacitances, and a resonance current flows as indicated by an arrow, so that the power module 12*a* and the power module 12*b* resonate between the parasitic capacitances. At this time, the smoothing capacitor 11 also resonates with the power modules. Note that, similarly to FIG. 8, the description of the turn-on current flowing through the power module group 13 is omitted.

As described above, when the power module group is switched, recovery timings of the internal diode vary, whereby a potential difference is generated between the power modules (the power module group 12 in FIG. 3) on a non-switching side, and the resonance current flows, so that the gate-source voltage Vgs rises and is erroneously turned on.

FIG. 10 is a voltage waveform diagram illustrating temporal changes of voltages in the two power module groups 12 and 13 included in the conventional power conversion device. In FIG. 10, a waveform diagram (a) illustrates voltage waveforms of the gate-source voltages Vgs of the power modules 12*a* and 12*b* in the states illustrated in FIGS. 4 to 9. A waveform diagram (b) illustrates voltage waveforms of the gate-source voltages Vgs of the power modules 13*a* and 13*b* set to the on state illustrated in FIGS. 5 to 9. A waveform diagram (c) illustrates voltage waveforms of the drain-source voltages Vds of the power modules 12*a* and 12*b*. A waveform diagram (d) illustrates voltage waveforms of the drain-source voltages Vds of the power modules 13*a* and 13*b*.

The recovery timings of the internal diode deviate from each other between the power module 12*a* and the power module 12*b*, whereby the drain-source voltage Vds of the power module 12*a* becomes higher than the drain-source voltage Vds of the power module 12*b* at a timing indicated by an arrow C in the waveform diagram (c). When the potential difference is generated between the drain-source voltages Vds, the power module 12*a* and the power module 12*b* resonate between the parasitic capacitances.

The power module 12*a* and the power module 12*b* resonate, and the current $I_1$ flows through the power modules 12*a* and 12*b*. Due to the current $I_1$, the gate-source voltages Vgs of the power modules 12*a* and 12*b* rise at a timing indicated by a symbol B in the waveform diagram (a). The gate-source voltage Vgs exceeds the threshold voltage Vth, whereby the erroneous on of the power module occurs.

Note that, heretofore, the problem of the conventional power conversion device has been described based on the premise that the recovery timings of the internal diode deviate from each other between the power modules due to a deviation of the switching timing of the power modules. Note that, this is an example, and even if the switching timings are the same between the power modules, if the inductance components Lab, Lab,' Lbb, and Lbb' of a main circuit illustrated in FIG. 3 and the like are not the same, currents flowing through the power modules in the on state are different from each other. As a result, the recovery timings in the power module also deviate from each other.

Next, the power conversion device 1 according to the first embodiment will be described.

To suppress the increase in the gate-source voltage Vgs of the power module described above, it is necessary to suppress generation of the current $I_1$ due to the resonance of the power modules illustrated in FIG. 8.

Note that the resonance between the parasitic capacitances generated by inertia after the generation of the potential difference between the power modules illustrated in FIG. 9 occurs mainly due to the current $I_1$.

On the other hand, the power conversion device 1 includes a bypass circuit that bypasses the gate line and the source line between the power modules, and the bypass circuit suppresses the resonance current $I_1$ from flowing into the gate terminal of the power module. As a result, the increase in the gate-source voltage Vgs of the power module is suppressed.

Figure 11:
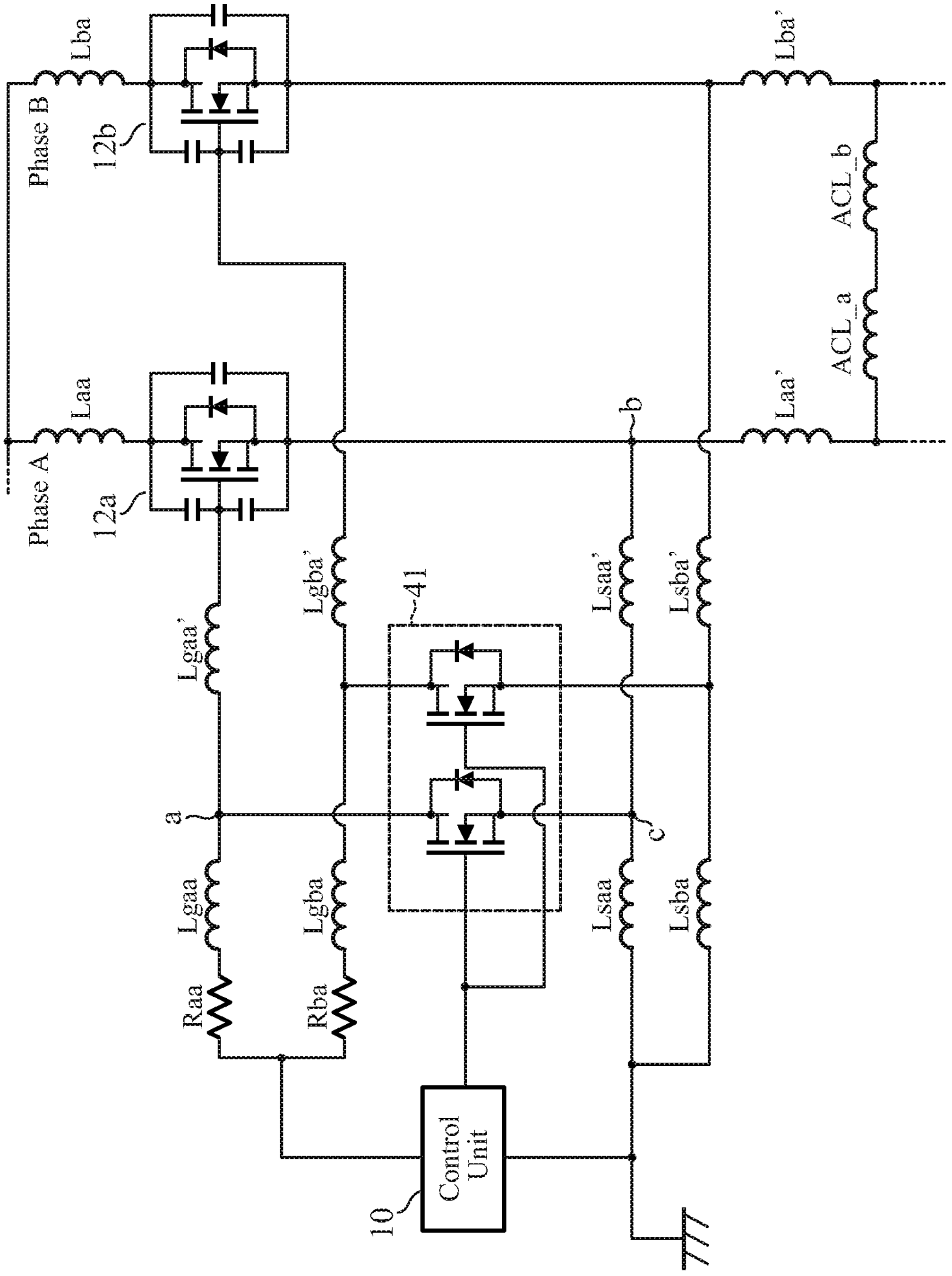
FIG. 11 is a partial circuit diagram illustrating a configuration of a power module group included in the power conversion device according to the first embodiment.

FIG. 11 is a partial circuit diagram illustrating a configuration of the power module group 12 included in the power conversion device 1 according to the first embodiment. Although FIG. 11 illustrates the configuration of only the power module group 12, in the power conversion device 1, all of the power module groups 12 to 17 illustrated in FIG. 1 have the configuration illustrated in FIG. 11. The power module group 12 (to 17) included in the power conversion device 1 is provided with a bypass circuit 41. The bypass circuit 41 includes two semiconductor switching elements. The two semiconductor switching elements included in the bypass circuit 41 are subjected to the on-off control by the control unit 10.

As the semiconductor switching element included in the bypass circuit 41, for example, a MOSFET is used. Note that a semiconductor switching element including an IGBT and a diode Di may be used. In the following description, it is assumed that the semiconductor switching element included in the bypass circuit 41 is a MOSFET. Wiring lines connecting the control unit 10 to the source terminals of the power modules 12*a* and 12*b* (Hereinafter, the wiring lines are referred to as source lines.) are connected to the drain terminals of the power modules 13*a* and 13*b* illustrated in FIG. 3 and the like. In addition, wiring lines connecting the source terminals of the power modules 12*a* and 12*b* to the drain terminals of the power modules 13*a* and 13*b* (not illustrated in FIG. 11) are referred to as main circuit lines.

In each of the two semiconductor switching elements included in the bypass circuit 41, the source terminal is connected to the source line, and the drain terminal is connected to the gate line connecting the control unit 10 to the gate terminal of a corresponding one of the power modules 12*a* and 12*b*. A connection point between the drain terminal of the semiconductor switching element included in the bypass circuit 41 and the gate line is a first connection point a. That is, the first connection point a is a connection point between the drain terminal that is one terminal of the terminal pair of the semiconductor switching element of the bypass circuit 41 and the gate terminal that is the control terminal of a corresponding one of the power modules 12*a* and 12*b*.

A connection point between the main circuit line and the source line is a second connection point b. That is, the second connection point b is a connection point between the source terminal that is the other terminal of the terminal pair of the semiconductor switching element of the bypass circuit 41, and the source terminal that is one terminal of the terminal pair of a corresponding one of the power modules 12*a* and 12*b*.

In addition, a connection point between the source terminal of the semiconductor switching element of the bypass circuit 41 and the source line is a third connection point c. That is, the third connection point c is a connection point between the control unit 10 and the source terminal that is the other terminal of the terminal pair of the semiconductor switching element of the bypass circuit 41.

In a partial section of the gate line from the control unit 10 to the first connection point a, the gate resistance Raa that is a resistance element is provided on the phase A side, and the gate resistance Rba that is a resistance element is provided on the phase B side. In the partial section of the gate line, the inductance component Lgaa exists on the phase A side, and the inductance component Lgba exists on the phase B side. Further, an inductance component Lgaa' exists in a partial section of the gate line from the first connection point a to the gate terminal of the power module 12*a*, and an inductance component Lgba' exists in a partial section of the gate line from the first connection point a to the gate terminal of the power module 12*b*.

In a partial section of the source line from the control unit 10 to the third connection point c, the inductance component Lsaa exists on the phase A side, and the inductance component Lsba exists on the phase B side. Further, in a partial section of the source line from the third connection point c to the second connection point b, the inductance component Lsaa' exists on the phase A side, and the inductance component Lsba' exists on the phase B side.

Not to affect the switching of the power modules 12*a* and 12*b*, the control unit 10 sets the semiconductor switching element of the bypass circuit 41 to the off state when the power modules 12*a* and 12*b* are on, and switches the semiconductor switching element of the bypass circuit 41 to the on state when the power modules 12*a* and 12*b* are off.

Figure 12:
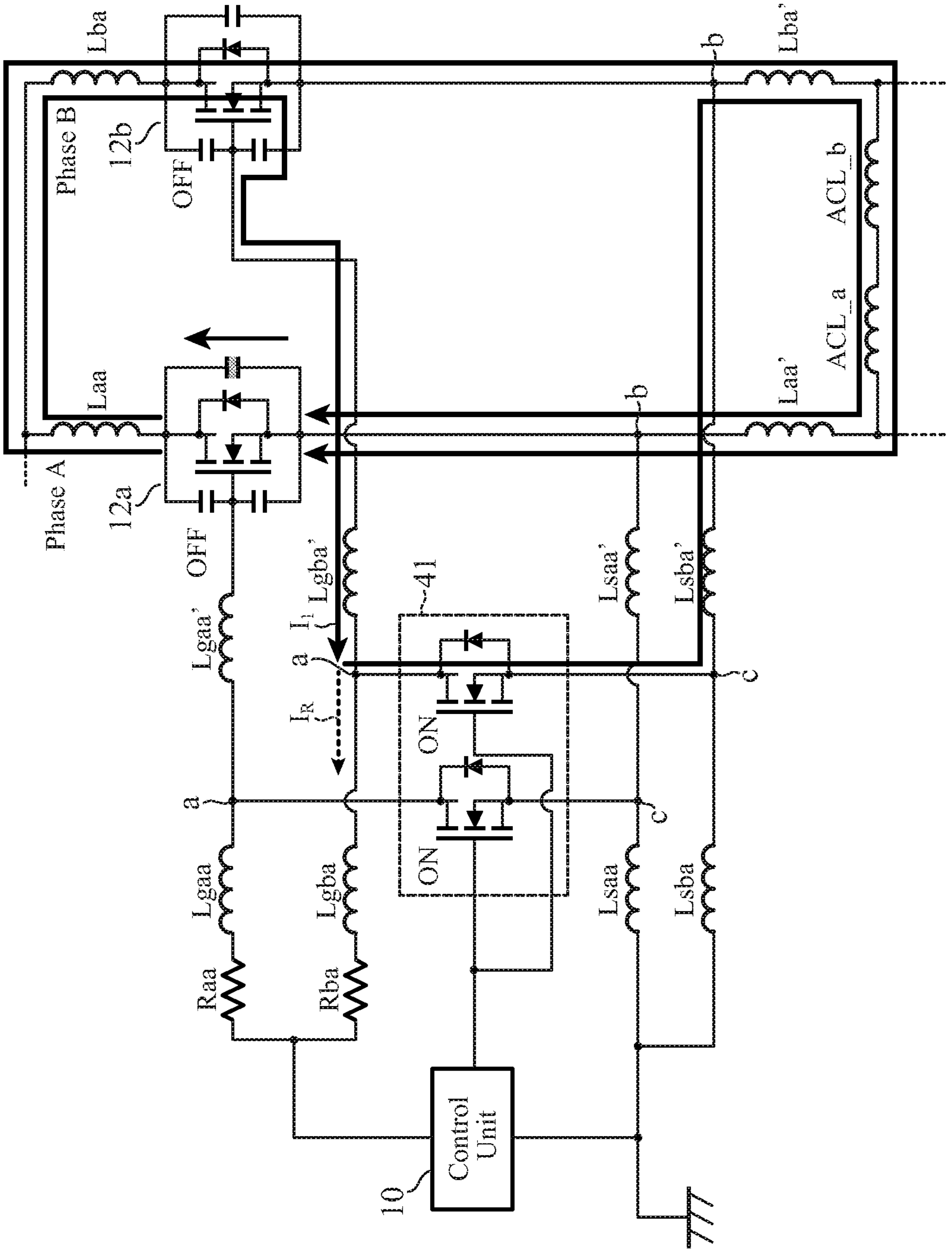
FIG. 12 is a partial circuit diagram illustrating a state in which a resonance current flows through the power module group included in the power conversion device according to the first embodiment.

FIG. 12 is a partial circuit diagram illustrating a state in which a resonance current flows through the power module group 12 included in the power conversion device 1. In FIG. 12, the power module group 12 is in a state in which the parasitic capacitance of the power module 12*a* is charged and the current $I_1$ (Hereinafter, the current is referred to as the resonance current $I_1$.) due to resonance is generated as illustrated in FIG. 8. Since the power modules 12*a* and 12*b* are in the off state when the resonance current $I_1$ is generated, the control unit 10 sets the semiconductor switching element of the bypass circuit 41 to the on state.

Here, as indicated by an arrow in FIG. 12, the resonance current $I_1$ is input from the drain terminal of the power module 12*a* to the gate terminal of the power module 12*b*, further output from the drain terminal of the semiconductor switching element of the bypass circuit 41 to the source line and the main circuit line through the source terminal, and bypassed to the source terminal of the power module 12*a*. As a result, the resonance current $I_1$ flowing into the gate terminal of the power module 12*a* is suppressed, and an increase in the gate voltage (gate-source voltage Vgs) of the power module 12*a* is suppressed.

Figure 13:
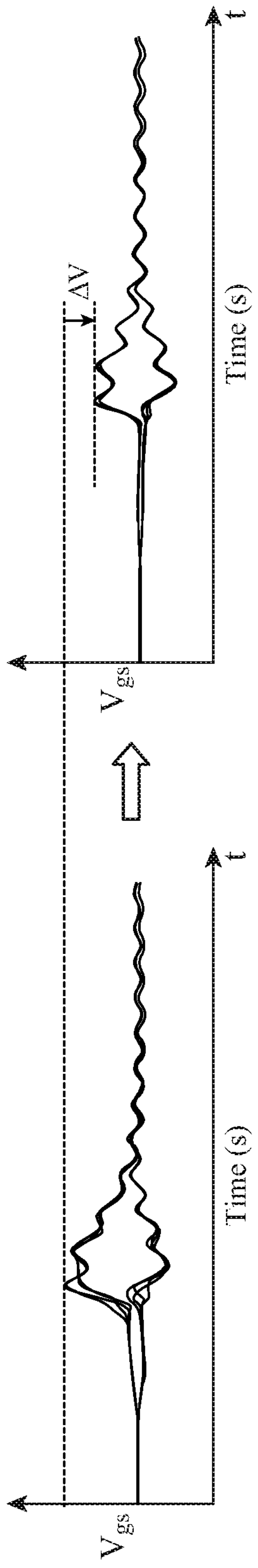
FIG. 13 is a voltage waveform diagram illustrating a temporal change of a gate-source voltage of the power module group included in the power conversion device according to the first embodiment.

FIG. 13 is a voltage waveform diagram illustrating a temporal change of a gate-source voltage of the power module group 12 included in the power conversion device 1, and illustrates a gate-source voltage waveform of the power module 12*a* in the state illustrated in FIG. 12. The voltage waveform on the left side of FIG. 13 is a gate-source voltage waveform of the power module 12*a* in the conventional power conversion device. The resonance current $I_1$ flows into the gate terminal of the power module 12*a*, whereby the gate voltage (gate-source voltage Vgs) of the power module 12*a* increases.

The voltage waveform on the right side of FIG. 13 is a gate-source voltage waveform of the power module 12*a* in the power conversion device 1. The bypass circuit 41 suppresses the resonance current $I_1$ flowing into the gate terminal of the power module 12*a*, whereby the increase in the gate-source voltage Vgs of the power module 12*a* is suppressed by $\Delta V$.

Figure 14:
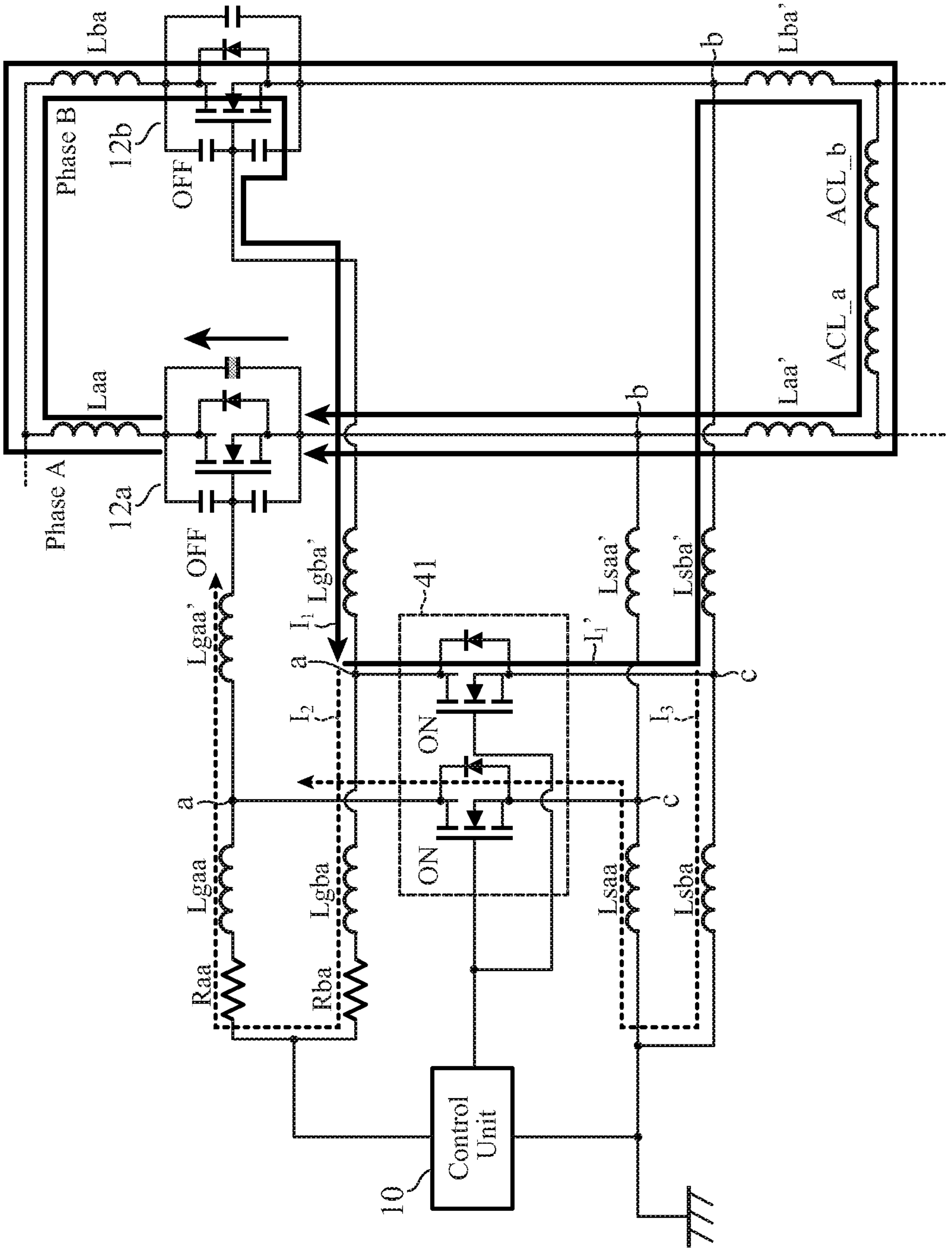
FIG. 14 is a partial circuit diagram illustrating a state in which a current flows through a bypass circuit between power modules in the power conversion device according to the first embodiment.

FIG. 14 is a partial circuit diagram illustrating a state in which a current flows through the bypass circuit 41 between the power modules 12*a* and 12*b* in the power conversion device 1. As illustrated in FIG. 14, the semiconductor switching element of the bypass circuit 41 is turned on, whereby the resonance current $I_1$ flowing into the gate terminal of the power module 12*a* passes through the bypass circuit 41.

In a case where the inductance component (Lsaa', Lsba') of a wiring line between the second connection point b and the third connection point c is large, a current $I_2$ as a part of the resonance current $I_1$ flows into the gate terminal of the power module 12*a* as indicated by a dashed arrow in FIG. 14. Alternatively, a current $I_3$ as a part of the resonance current $I_1$ passes through the bypass circuit 41 through the source line in which the inductance components Lsaa and Lsba exist, and then returns to the gate terminal of the power module 12*a*. As a result, the resonance current charges the parasitic capacitance of the power module 12*a*, and increases the gate-source voltage Vgs of the power module 12*a*.

To suppress the increase in the gate-source voltage Vgs, the inductance component (Lsaa', Lsba') existing between the second connection point b and the third connection point c is made smaller than the inductance component (Lgaa, Lgba) existing between the first connection point a and the control unit 10 and smaller than the inductance component (Lsaa, Lsba) existing between the third connection point c and the control unit 10. As a result, most of the resonance current $I_1$ passes through the bypass circuit 41 and flows through the main circuit line via the source line having the inductance component Lsaa' (or Lsba'). That is, the resonance current $I_1$ flowing into the gate terminal of the power module 12*a* is suppressed.

Next, a modification of the power conversion device 1 will be described.

Figure 15:
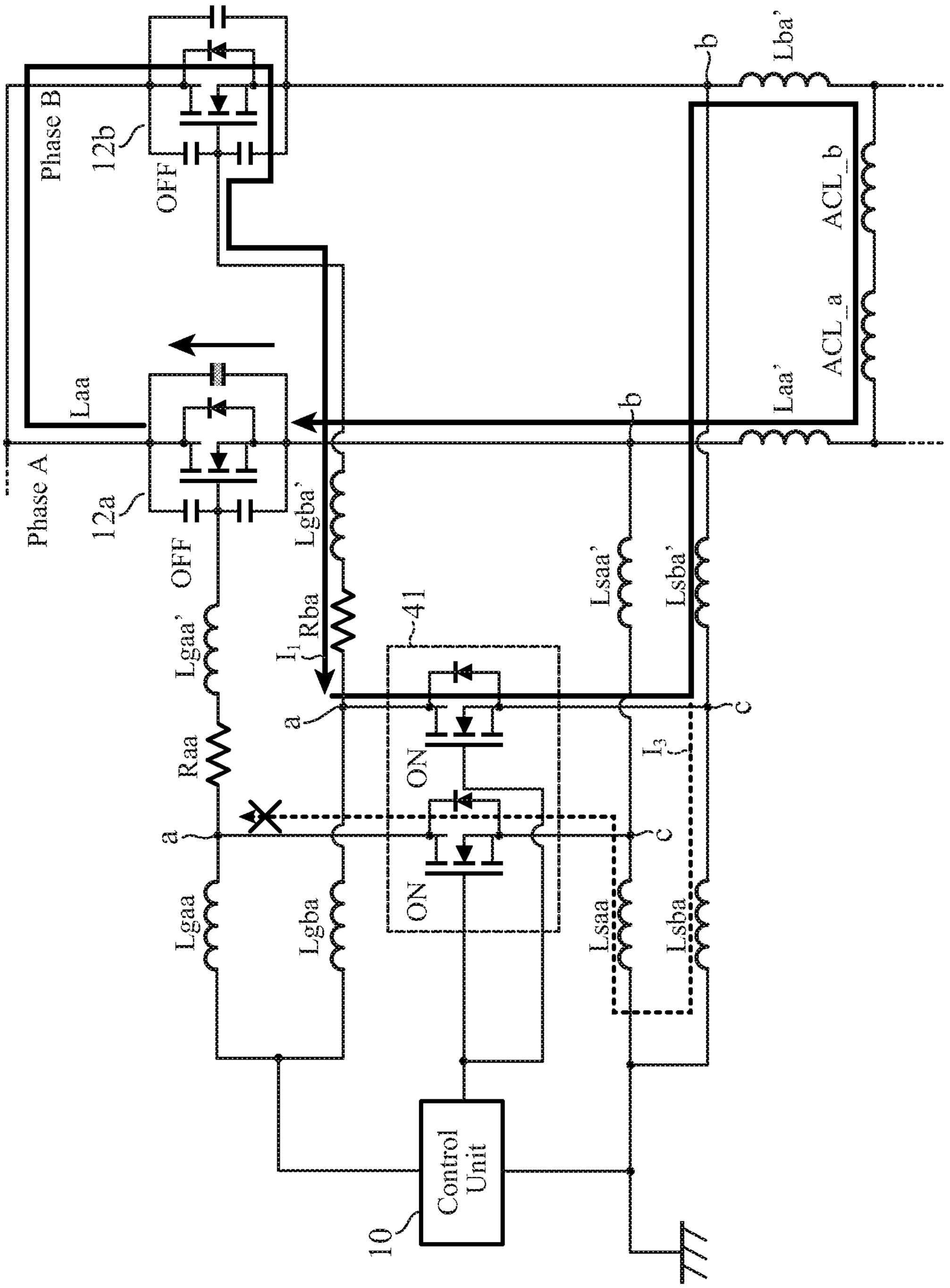
FIG. 15 is a partial circuit diagram illustrating a configuration of the power module group included in a first modification of the power conversion device according to the first embodiment.

FIG. 15 is a partial circuit diagram illustrating a configuration of the power module group 12 included in a first modification of the power conversion device 1 according to the first embodiment. In the first modification of the power conversion device 1, as illustrated in FIG. 15, in the gate lines connected to the gate terminals of the power modules 12*a* and 12*b*, the gate resistances Raa and Rba are provided on the gate terminal side from the first connection points a.

Since a potential of the source line is a reference ground potential on the control unit 10 side, the source line often is a solid pattern on a printed circuit board constituting the power conversion device. In this case, since the inductance components Lsaa and Lsba existing in the source line are small, there is a possibility that the current $I_3$ as a part of the resonance current $I_1$ returns to the gate terminal of the power module 12*a* via the source line and the bypass circuit 41 as indicated by a dashed arrow in FIG. 15.

In the first modification of the power conversion device 1, the gate resistances Raa and Rba are provided on the gate terminal side from the first connection points a. As a result, as illustrated in FIG. 15, since the impedance in a path through which the current $I_3$ flows increases by the gate resistance Raa in addition to the inductance components Lsaa, Lsba, and Lgaa', an amount of the current $I_3$, which is a part of the resonance current $I_1$, flowing into the gate terminal of the power module 12*a* can be suppressed.

Note that, the first modification of the power conversion device 1 has the configuration illustrated in FIG. 15, so that an amount of the resonance current $I_1$ flowing into the gate terminal of the power module 12*a* can be suppressed even if the source line is a solid pattern.

In addition, even in an impedance state of the power conversion device 1 illustrated in FIG. 14, it is possible to reduce the current $I_3$ flowing into the gate terminal by changing positions of the gate resistances Raa and Rba to positions on the gate terminal side of the power modules 12*a* and 12*b*.

Further, in the first modification of the power conversion device 1, even in an impedance state illustrated in FIG. 15, it is possible to reduce the current $I_3$ flowing into the gate terminal by changing the positions of the gate resistances Raa and Rba to the positions on the gate terminal side of the power modules 12*a* and 12*b*.

Figure 16:
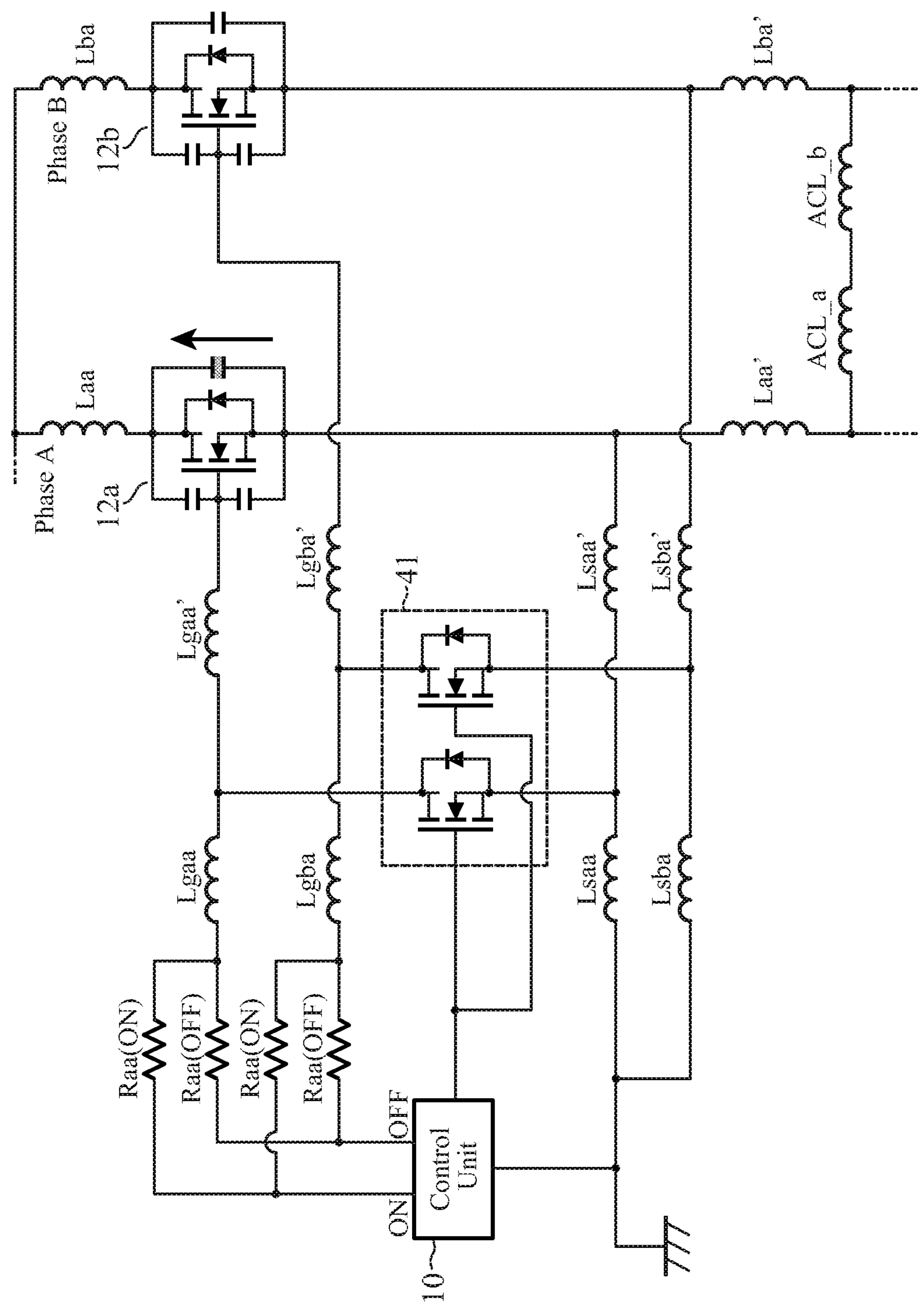
FIG. 16 is a partial circuit diagram illustrating a state in which gate resistances each are changed between on and off in the power module group included in a second modification of the power conversion device according to the first embodiment.

FIG. 16 is a partial circuit diagram illustrating a state in which gate resistances Raa each are changed between on and off in the power module group 12 included in a second modification of the power conversion device 1. In the second modification of the power conversion device 1, assuming a case where on/off switching speeds of the power modules 12*a* and 12*b* are different from each other, switching is performed between a gate resistance Raa(ON) and a gate resistance Raa(OFF) having resistance values different from each other.

For example, the control unit 10 performs switching to the gate resistance Raa(ON) when setting the power modules 12*a* and 12*b* to the on state, and performs switching to the gate resistance Raa(OFF) when setting the power modules 12*a* and 12*b* to the off state. Here, it is assumed that the gate resistance Raa(ON) has a larger value than the gate resistance Raa(OFF).

Figure 17:
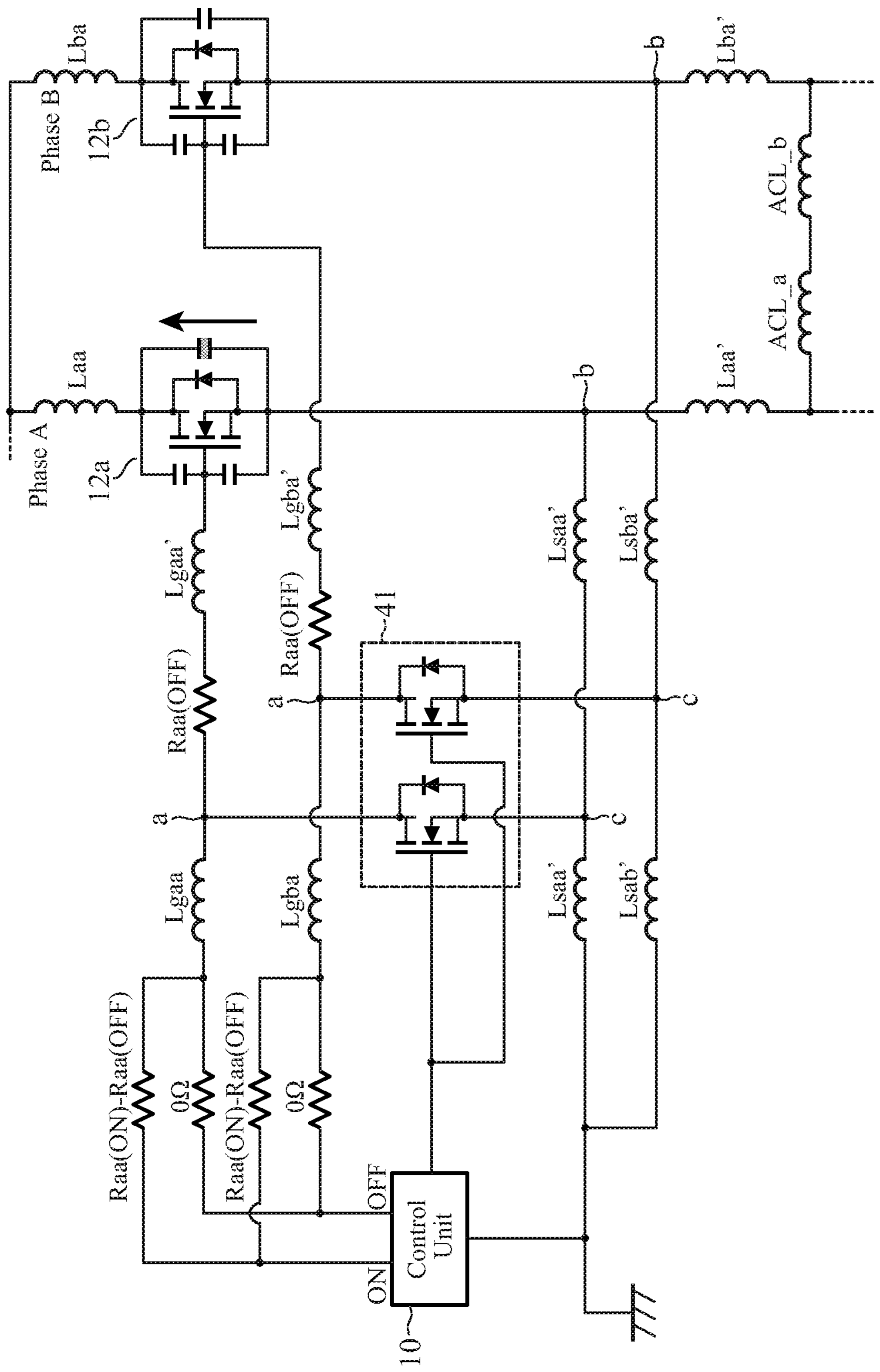
FIG. 17 is a partial circuit diagram illustrating the power module group included in the second modification of the power conversion device according to the first embodiment, in which an arrangement of the gate resistances is changed so that a resonance current flows through a bypass circuit.

FIG. 17 is a partial circuit diagram illustrating the power module group 12 included in the second modification of the power conversion device 1, in which the arrangement of the gate resistances Raa is changed so that the resonance current $I_1$ flows through the bypass circuit 41. In the power module group 12 illustrated in FIG. 17, the gate resistance Raa(OFF) that is a first resistance element is provided at a wiring line portion between the first connection point a and the gate terminal of a corresponding one of the power modules 12*a* and 12*b* in the gate line illustrated in FIG. 16.

As illustrated in FIG. 17, a value of the resistance switched when the control unit 10 sets the power modules 12*a* and 12*b* to the on state is set to Raa(ON)-Raa(OFF), and a value of the resistance switched when the power modules 12*a* and 12*b* are set to the off state is set to 0 ohm.

When setting the power modules 12*a* and 12*b* to the on state, the control unit 10 switches the gate resistance to Raa(ON)-Raa(OFF) so that the resonance current $I_1$ flows through the bypass circuit 41. At this time, the resistance of the gate line is expressed by the following formula (1).

$$Raa(ON)—Raa(OFF)+Raa(OFF)=Raa(ON) \quad (1)$$

The control unit 10 switches the gate resistance to 0 ohm when setting the power modules 12*a* and 12*b* to the off state. At this time, the resistance of the gate line is expressed by the following formula (2). Since the resistances are arranged when the power modules 12*a* and 12*b* are turned on and off, the bypass circuit 41 suppresses the resonance current $I_1$ from flowing into the gate terminals of the power modules 12*a* and 12*b*. At this time, the bypass circuit 41 does not affect the switching speeds of the power modules 12*a* and 12*b*.

$$0ohm+Raa(OFF)=Raa(OFF) \quad (2)$$

Figure 18:
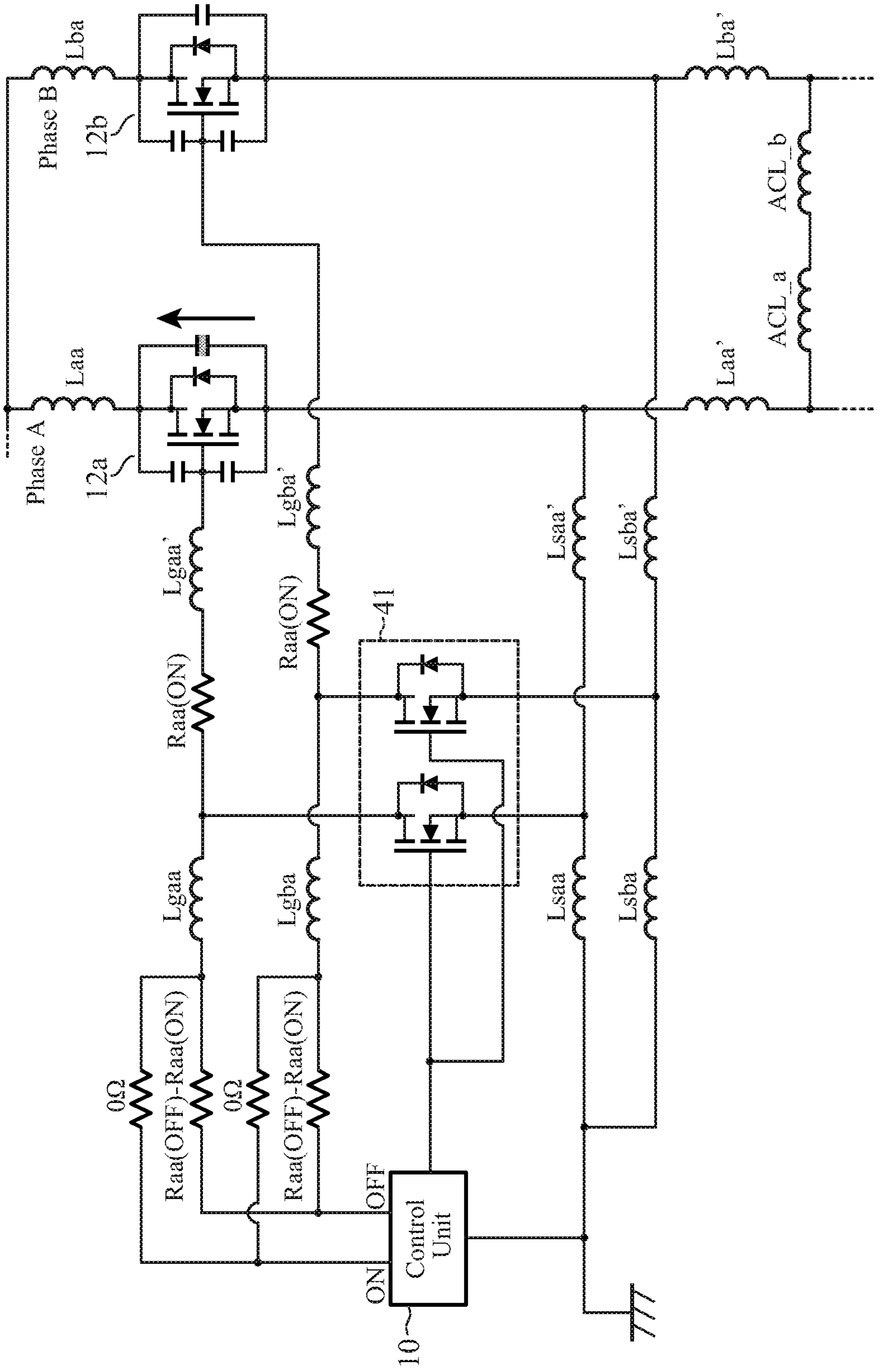
FIG. 18 is a partial circuit diagram illustrating the power module group included in the second modification of the power conversion device according to the first embodiment, in which the arrangement of the gate resistances is changed so that an off gate resistance is higher than an on gate resistance.

FIG. 18 is a partial circuit diagram illustrating the power module group 12 included in the second modification of the power conversion device 1, in which the arrangement of the gate resistances is changed so that an off gate resistance is higher than an on gate resistance. In the power module group 12 illustrated in FIG. 18, the gate resistance Raa(ON) that is the first resistance element is disposed at the wiring line portion between the first connection point a and the gate terminal of a corresponding one of the power modules 12*a* and 12*b* in the gate line illustrated in FIG. 16.

As illustrated in FIG. 18, a value of the resistance switched when the control unit 10 sets the power modules 12*a* and 12*b* to the off state is set to Raa(OFF)-Raa(ON), and a value of the resistance switched when the power modules 12*a* and 12*b* are set to the on state is set to 0 ohm.

The control unit 10 switches the gate resistance to 0 ohm when setting the power modules 12*a* and 12*b* to the on state. At this time, the resistance of the gate line is expressed by the following formula (3).

$$0ohm+Raa(ON)=Raa(ON) \quad (3)$$

The control unit 10 switches the gate resistance to Raa (OFF)-Raa(ON) when setting the power modules 12*a* and 12*b* to the off state. At this time, the resistance of the gate line is expressed by the following formula (4). Since the resistances are arranged when the power modules 12*a* and 12*b* are turned on and off, the bypass circuit 41 suppresses the resonance current $I_1$ from flowing into the gate terminals of the power modules 12*a* and 12*b*. At this time, the bypass circuit 41 does not affect the switching speeds of the power modules 12*a* and 12*b*.

$$Raa(OFF)—Raa(ON)+Raa(ON)=Raa(OFF) \quad (4)$$

As described above, the power conversion device 1 according to the first embodiment includes: the control unit 10 that switches between the on state in which the power modules 12*a* and 12*b* are made conductive between the drain terminal and the source terminal and the off state in which the power module is made non-conductive, by supplying the control signal to the gate terminals of the power modules 12*a* and 12*b*; the gate resistances Raa and Rba connected between the control unit 10 and the gate terminals of the power modules 12*a* and 12*b*; and the bypass circuit 41 in which the drain terminals of the semiconductor switching elements provided for the respective power modules are connected to the gate terminals of the power modules 12*a* and 12*b*, and the source terminals of the semiconductor switching elements are connected to the source terminals of the power modules 12*a* and 12*b*, in which the control unit 10 switches the semiconductor switching elements of the bypass circuit 41 to the on state when the power modules 12*a* and 12*b* are switched to the off state. By switching the semiconductor switching elements of the bypass circuit 41 to the on state when the power modules 12*a* and 12*b* are switched to the off state, the bypass circuit 41 reduces the resonance current $I_1$ flowing through the gate terminals of the power modules 12*a* and 12*b*. As a result, the power conversion device 1 can suppress the erroneous on due to resonance of the power modules 12*a* and 12*b*.

In the power conversion device 1 according to the first embodiment, the control unit 10 is connected to the source terminal of the semiconductor switching element of the bypass circuit 41. The connection point between the drain terminal of the semiconductor switching element of the bypass circuit 41 and the gate terminal of a corresponding one of the power modules 12*a* and 12*b* is the first connection point a. The connection point between the source terminal of the semiconductor switching element of the bypass circuit 41 and the source terminal of a corresponding one of the power modules 12*a* and 12*b* is the second connection point b. The connection point between the control unit 10 and the source terminal of the semiconductor switching element of the bypass circuit 41 is the third connection point c. The inductance component (Lsaa,' Lsba') between the second connection point b and the third connection point c is smaller than the inductance component (Lgaa, Lgba) between the first connection point a and the control unit 10, and smaller than the inductance component (Lsaa, Lsba) between the third connection point c and the control unit 10.

As a result, the resonance current flowing into the gate terminals of the power modules 12*a* and 12*b* can be suppressed.

In the power conversion device 1 according to the first embodiment, the connection point between the drain terminal of the semiconductor switching element of the bypass circuit 41 and the gate terminal of a corresponding one of the power modules 12*a* and 12*b* is the first connection point a. The gate resistances Raa and Rba are provided between the gate terminals of the power modules 12*a* and 12*b* and the first connection points a. As described above, it is possible to reduce the current $I_3$ flowing into the gate terminal by changing the positions of the gate resistances Raa and Rba to the positions on the gate terminal side of the power modules 12*a* and 12*b*.

In the power conversion device 1 according to the first embodiment, the connection point between the drain terminal of the semiconductor switching element of the bypass circuit 41 and the gate terminal of a corresponding one of the power modules 12*a* and 12*b* is the first connection point a. Included are: the resistance Raa(ON) that is provided between the control unit 10 and the first connection point a and is an on-side resistance element selected when the power modules 12*a* and 12*b* are turned on; and the resistance Raa(OFF) that is provided between the control unit 10 and the first connection point a and is an off-side resistance element selected when the power modules 12*a* and 12*b* are turned off. The control unit 10 supplies the control signal to the gate terminals of the power modules 12*a* and 12*b* through the resistance Raa(ON) to set the power modules 12*a* and 12*b* to the on state, and supplies the control signal to the gate terminals of the power modules 12*a* and 12*b* through the resistance Raa(OFF) to set the power modules 12*a* and 12*b* to the off state. As a result, it is possible to cause the resonance current $I_1$ to flow through the bypass circuit 41.

The power conversion device 1 according to the first embodiment includes: the resistance Raa(ON) that is provided between the control unit 10 and the first connection point a and is an on-side resistance element selected when the power modules 12*a* and 12*b* are turned on; and the resistance Raa(OFF) that is provided between the control unit 10 and the first connection point a and is an off-side resistance element selected when the power modules 12*a* and 12*b* are turned off. The gate resistances Raa and Rba have the same resistance value as the resistance Raa(OFF), Raa(ON) has a resistance value that is a difference from the resistances Raa and Rba, and the resistance Raa(OFF) has a resistance value of 0 ohm. As a result, it is possible to cause the resonance current $I_1$ to flow through the bypass circuit 41.

The power conversion device 1 according to the first embodiment includes: the resistance Raa(ON) that is provided between the control unit 10 and the first connection point a and is an on-side resistance element selected when the power modules 12*a* and 12*b* are turned on; and the resistance Raa(OFF) that is provided between the control unit 10 and the first connection point a and is an off-side resistance element selected when the power modules 12*a* and 12*b* are turned off. The gate resistances Raa and Rba have the same resistance value as the resistance Raa(ON), Raa(OFF) has a resistance value that is a difference from the resistances Raa and Rba, and the resistance Raa(ON) has a resistance value of 0 ohm. As a result, it is possible to cause the resonance current $I_1$ to flow through the bypass circuit 41.

Second Embodiment

Figure 19:
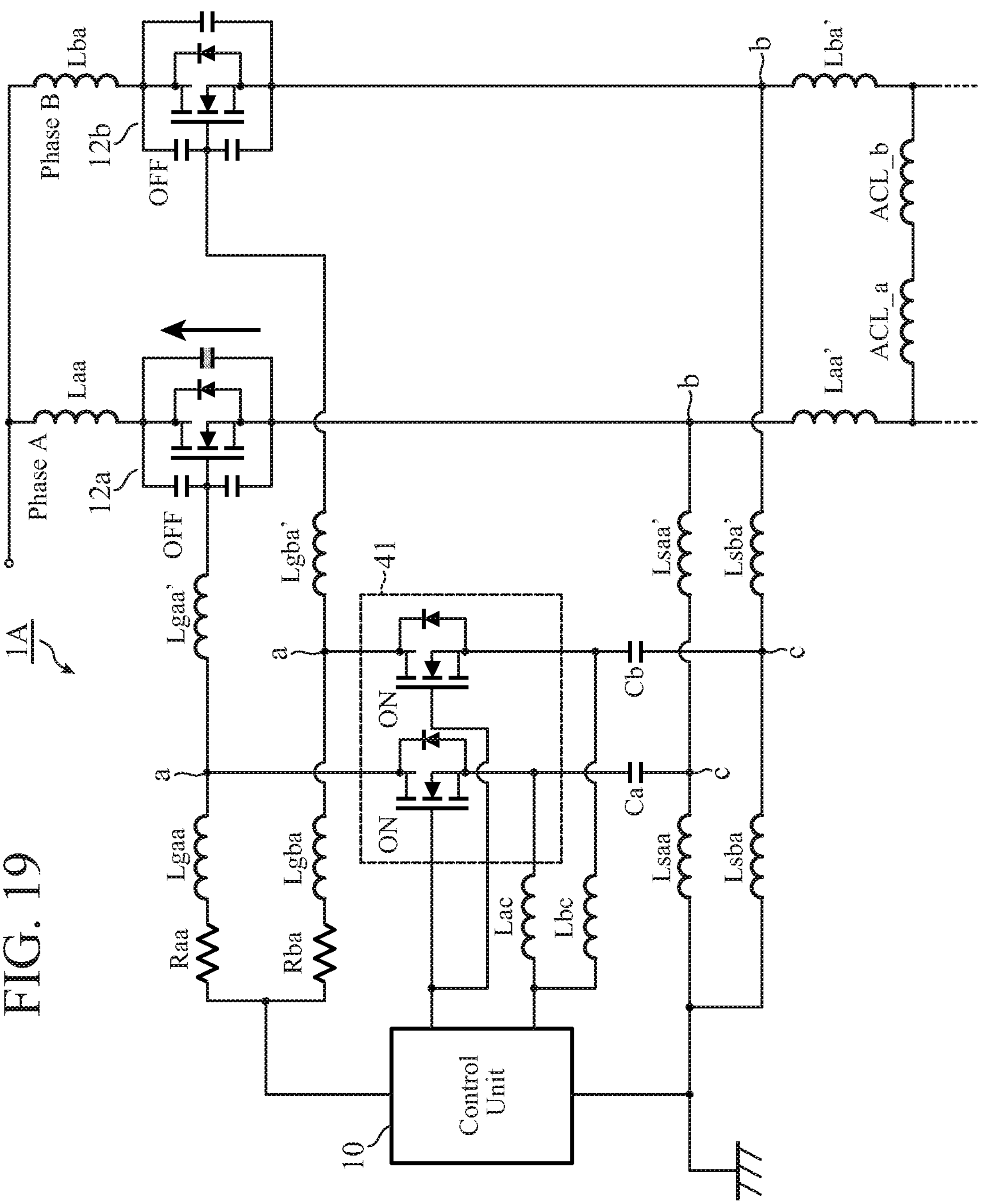
FIG. 19 is a partial circuit diagram illustrating a configuration of a power module group included in a power conversion device according to a second embodiment.

FIG. 19 is a partial circuit diagram illustrating a configuration of a power module group included in a power conversion device 1A according to a second embodiment. Although FIG. 19 illustrates the configuration of only the power module group 12, in the power conversion device 1A, all of the power module groups 12 to 17 illustrated in FIG. 1 have the configuration illustrated in FIG. 19. As illustrated in FIG. 19, the power conversion device 1A includes capacitors Ca and Cb that are first capacitors connecting the source terminals of the semiconductor switching elements of the bypass circuit 41 and the source terminals of the power modules 12*a* and 12*b*.

In the power conversion device 1A, the semiconductor switching elements of the bypass circuit 41 and the power modules 12*a* and 12*b* have mutually different reference potentials between the source terminals connected together via the capacitors Ca and Cb. For example, as illustrated in FIG. 19, the reference potentials are different from each other between a wiring line in which the inductance components Lac and Lbc exist and a wiring line in which the inductance components Lsaa and Lsba exist.

Potentials of the source terminals of the semiconductor switching elements of the bypass circuit 41 are different from the potentials of the source terminals of the power modules 12*a* and 12*b*. For this reason, if the bypass circuit 41 is connected similarly to the power conversion device 1, a short-circuit current flows between source lines. Thus, in the power conversion device 1A, capacitors Ca and Cb for coupling are inserted between the source lines. As a result, the power conversion device 1A can bypass the resonance current that is an AC component to the source terminal side via the bypass circuit 41 and the capacitors Ca and Cb.

Figure 20:
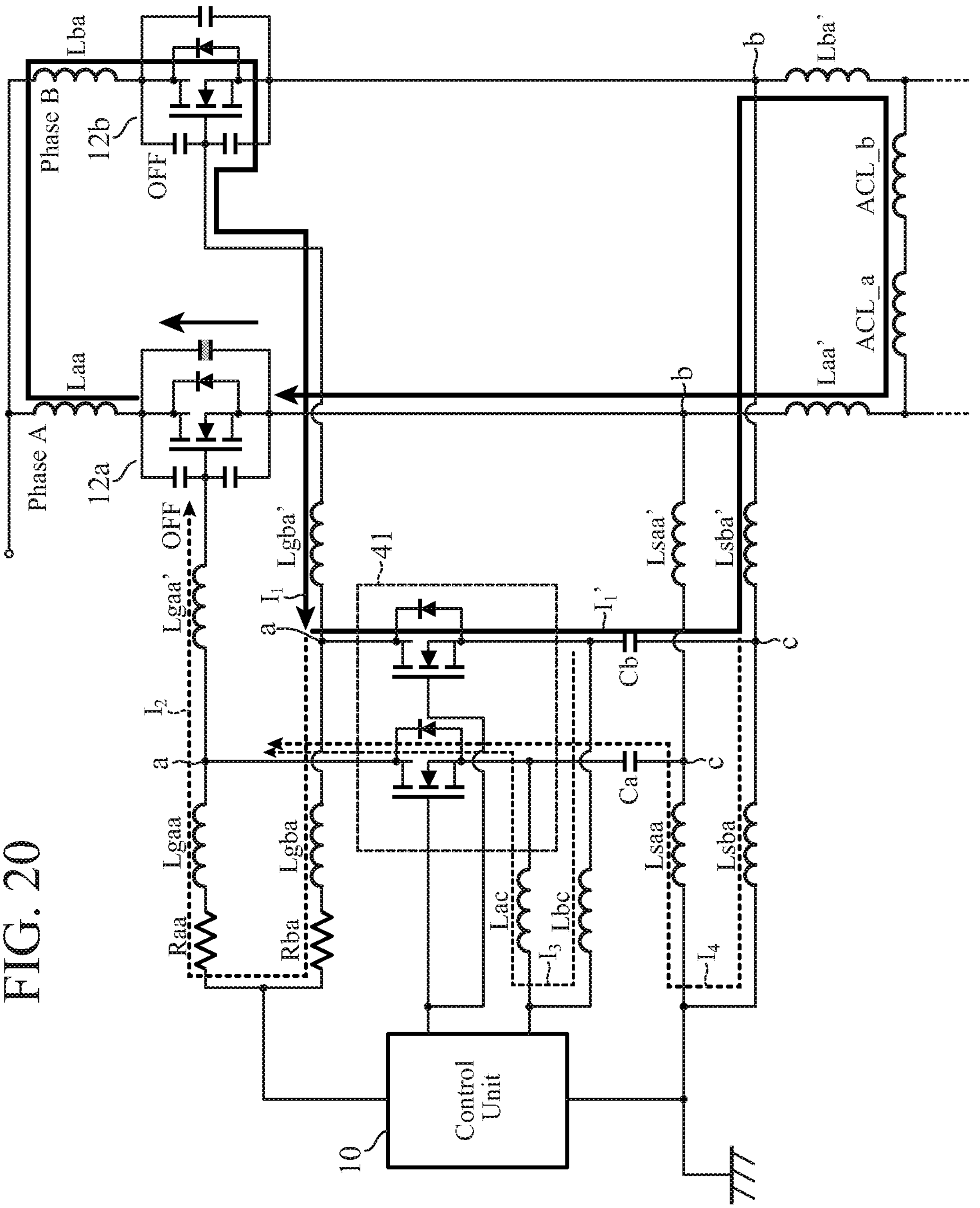
FIG. 20 is a partial circuit diagram illustrating a state in which a resonance current flows through a bypass circuit in the power module group included in the power conversion device according to the second embodiment.

FIG. 20 is a partial circuit diagram illustrating a state in which the resonance current flows through the bypass circuit 41 in the power module group 12 included in the power conversion device 1A. As illustrated in FIG. 20, the semiconductor switching element included in the bypass circuit 41 is turned on, whereby the resonance current $I_1$' passes through the bypass circuit 41 as indicated by a solid arrow in FIG. 20. On the other hand, the impedances of the capacitors Ca and Cb between the source lines of the semiconductor switching elements included in the bypass circuit 41 and the source lines of the power modules 12*a* and 12*b* need to be smaller than the impedance of the inductance component of the source line of the bypass circuit 41.

Thus, the power conversion device 1A suppresses the generation of a current path of the current $I_3$ by setting a relationship of $1/j\omega C<j\omega L$ when a reference impedance frequency is set as a resonance frequency ($j\omega$) of the resonance current.

Next, similarly to the power conversion device 1, in a case where the inductance components Lsaa' and Lsba' of the source lines of the power modules 12*a* and 12*b* are large, after the resonance current $I_1$ passes through the bypass circuit 41, as illustrated in FIG. 20, a current $I_4$ is generated that returns from the other semiconductor switching element of the bypass circuit 41 to the gate terminal through the source line including the inductance components Lsba and Lsaa. The parasitic capacitance (gate capacitance) of the power module 12*a* is charged by the resonance current $I_4$, and an increase in the gate voltage (gate floating) occurs. To prevent this, in the power conversion device 1A, the inductance component (Lsaa', Lsba') in the wiring line between the second connection point b and the third connection point c is made smaller than the inductance component (Lsaa, Lsba) in the wiring line between the control unit 10 and the third connection point c.

Figure 21:
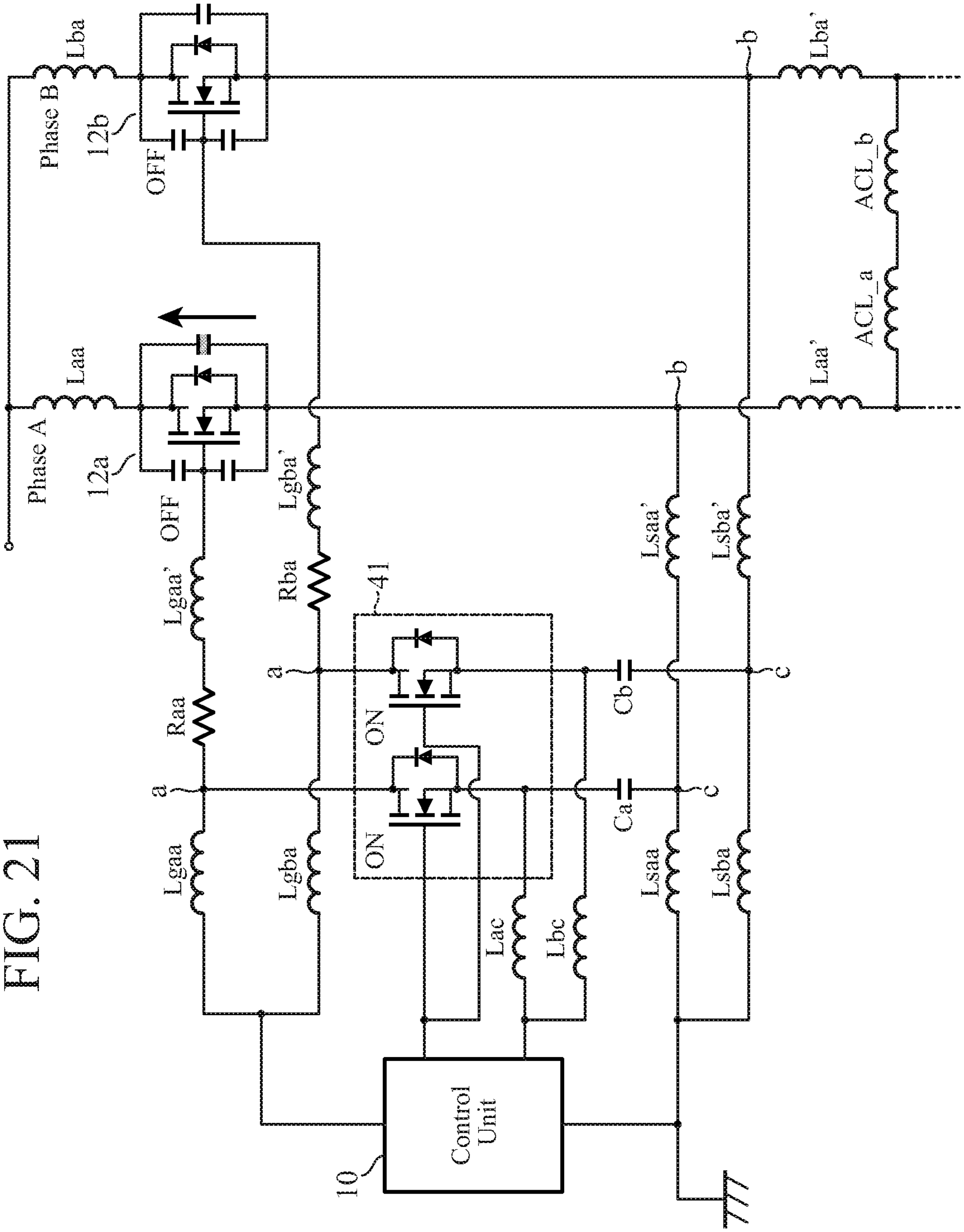
FIG. 21 is a partial circuit diagram illustrating a configuration of a power module group included in a modification of the power conversion device according to the second embodiment.

FIG. 21 is a partial circuit diagram illustrating a configuration of the power module group 12 included in a modification of the power conversion device 1A. In the modification of the power conversion device 1A, similarly to FIG. 15 illustrated in the first embodiment, the gate resistances Raa and Rba are arranged between the first connection points a and the gate terminals of the power modules 12*a* and 12*b*. As a result, since the impedances of current paths of the currents $I_2$ to $I_4$ branching from the resonance current $I_1$ and flowing into the gate terminals of the power modules 12*a* and 12*b* increase, these currents are suppressed.

As described above, the power conversion device 1A according to the second embodiment includes the capacitors Ca and Cb for coupling that connect the source terminals of the semiconductor switching elements of the bypass circuit 41 and the source terminals of the power modules 12*a* and 12*b*. The semiconductor switching elements of the bypass circuit 41 and the power modules 12*a* and 12*b* have mutually different potentials between the terminals connected together via the capacitors Ca and Cb. As a result, the power conversion device 1A can bypass the resonance current that is the AC component to the source terminal side via the bypass circuit 41 and the capacitors Ca and Cb.

Third Embodiment

Figure 22:
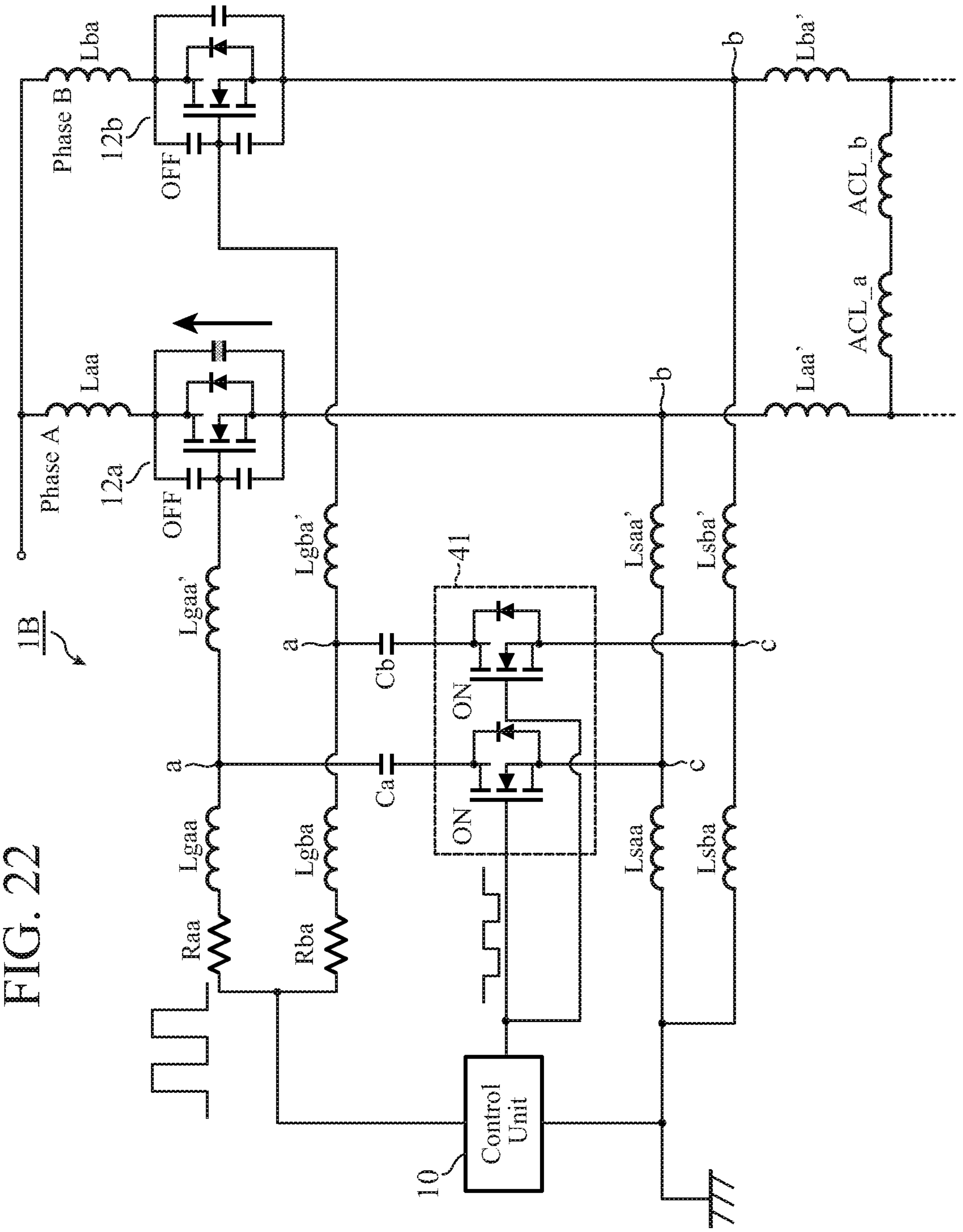
FIG. 22 is a partial circuit diagram illustrating a configuration of a power module group included in a power conversion device according to a third embodiment.

FIG. 22 is a partial circuit diagram illustrating a configuration of the power module group 12 included in a power conversion device 1B according to a third embodiment. Although FIG. 22 illustrates the configuration of only the power module group 12, in the power conversion device 1B, all of the power module groups 12 to 17 illustrated in FIG. 1 have the configuration illustrated in FIG. 22. As illustrated in FIG. 22, the power conversion device 1B includes capacitors Ca and Cb that are second capacitors connecting the drain terminals of the semiconductor switching elements of the bypass circuit 41 and the gate terminals of the power modules 12*a* and 12*b*.

In the power conversion device 1B, the semiconductor switching elements of the bypass circuit 41 and the power modules 12*a* and 12*b* have mutually different gate drive voltages for switching. For example, as illustrated in FIG. 22, a gate drive voltage applied to gate lines between the control unit 10 and the gate terminals of the power modules 12*a* and 12*b*, and a gate drive voltage applied to wiring lines between the control unit 10 and the gate terminals of the semiconductor switching elements of the bypass circuit 41 are different from each other.

In a case where the power modules 12*a* and 12*b* are driven in positive and negative (for example, −5 V to +20) and the semiconductor switching elements of the bypass circuit 41 are driven in 0 to 5 V, the drain terminals of the semiconductor switching elements of the bypass circuit 41 and the gate lines of the power modules 12*a* and 12*b* cannot be connected to each other in a DC manner and need to be connected to each other in an AC manner. For this reason, the capacitors Ca and Cb are provided in the wiring lines between the first connection points a and the bypass circuit 41. As a result, similarly to the power conversion device 1A according to the second embodiment, it is possible to cause the resonance current $I_1$ to flow to the bypass circuit 41 side, and suppress the gate floating.

Here, to bypass the resonance current $I_1$ to the main circuit line through the capacitors Ca and Cb, through the bypass circuit 41, the inductance components of the wiring lines need to be set as follows. For example, the inductance component (Lsaa', Lsba') existing in the wiring line between the second connection point b and the third connection point c is made smaller than the inductance component (Lsaa, Lsba) existing in the wiring line between the control unit 10 and the third connection point c, and is made smaller than the inductance component (Lgaa, Lgba) existing in the gate line between the control unit 10 and the first connection point a.

Further, the combined impedance of the capacitor (Ca, Cb) and the inductance component (Lsaa', Lsba') is made smaller than the impedance at the gate line.

For example, the combined impedance ($1/j\omega Cb+j\omega Lsba'$) of the capacitor Cb and the inductance component Lsba' is made smaller than the impedance ($j\omega Lgba+j\omega Lgaa$) at the gate line. As a result, most of the resonance current $I_1$ passes through the capacitor (Ca, Cb), passes through the bypass circuit 41, and is bypassed to the main circuit line via the wiring line where the inductance component Lsba' (or Lsaa') exists.

Figure 23:
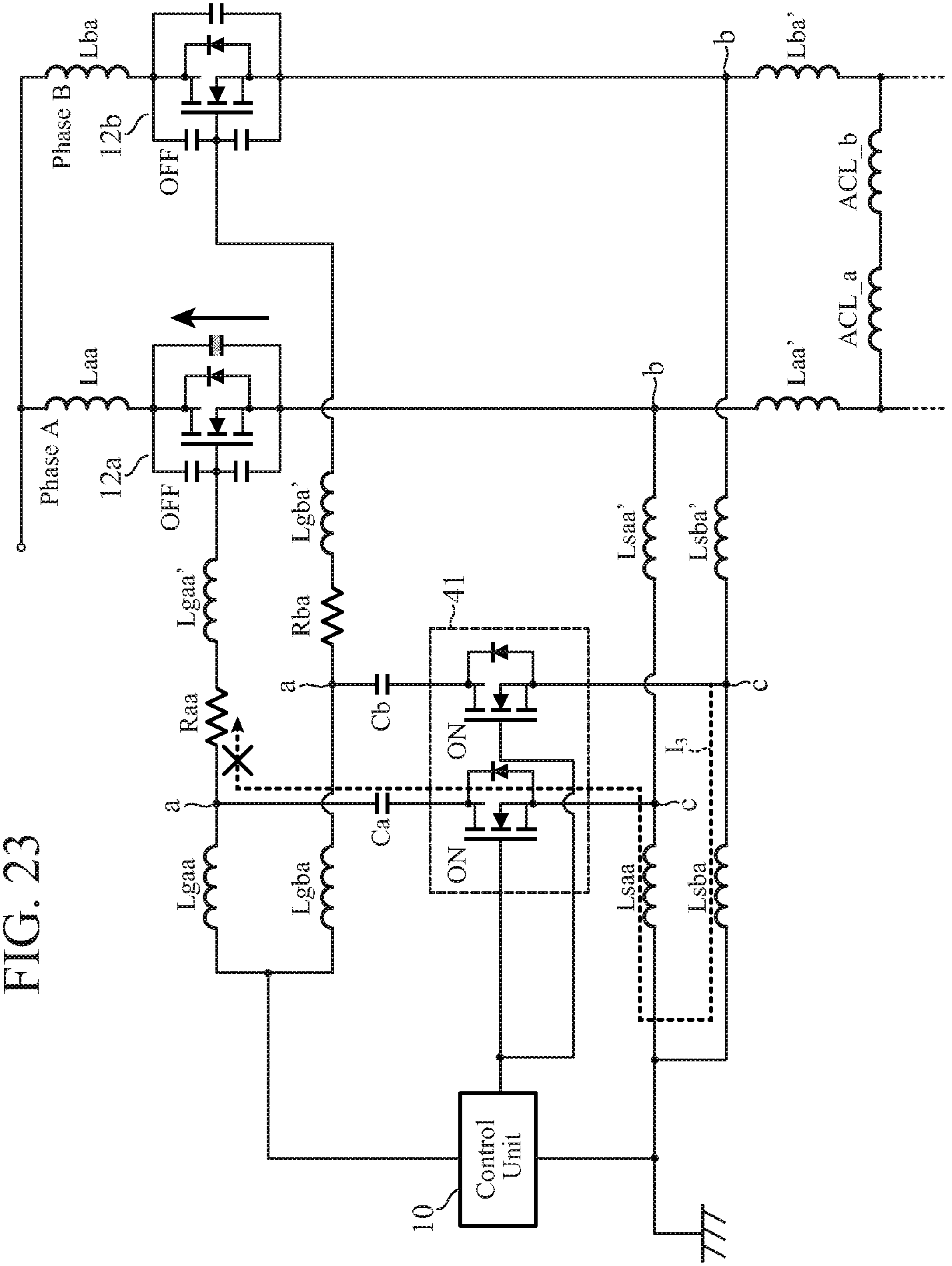
FIG. 23 is a partial circuit diagram illustrating a configuration of a power module group included in a first modification of the power conversion device according to the third embodiment.

FIG. 23 is a partial circuit diagram illustrating a configuration of the power module group 12 included in a first modification of the power conversion device 1B. In the first modification of the power conversion device 1B, the gate resistances Raa and Rba are arranged between the first connection points a and the gate terminals of the power modules 12*a* and 12*b*. The potentials of the source lines connected to the source terminals of the power modules 12*a* and 12*b* and the source terminals of the semiconductor switching elements of the bypass circuit 41 may be the reference ground potential of the control unit 10. For this reason, the source line often is a solid pattern of a printed circuit board on which the power conversion device 1B is provided. In this case, there is a possibility that the inductance components Lsaa and Lsba existing in the source lines are small, and a part of the resonance current $I_1$ is returned as the current $I_3$ to the gate terminals of the power modules

12*a* and 12*b* via the source lines and the bypass circuit 41 as indicated by a dashed arrow in FIG. 23.

To suppress this, the gate resistances Raa and Rba are arranged between the first connection points a and the gate terminals of the power modules 12*a* and 12*b*, whereby the impedance (Lsaa+Lsba+Lgaa'+Raa) in the current path of the current $I_3$ increases, and the current $I_3$ flowing into the gate terminals of the power modules 12*a* and 12*b* can be suppressed.

Figure 24:
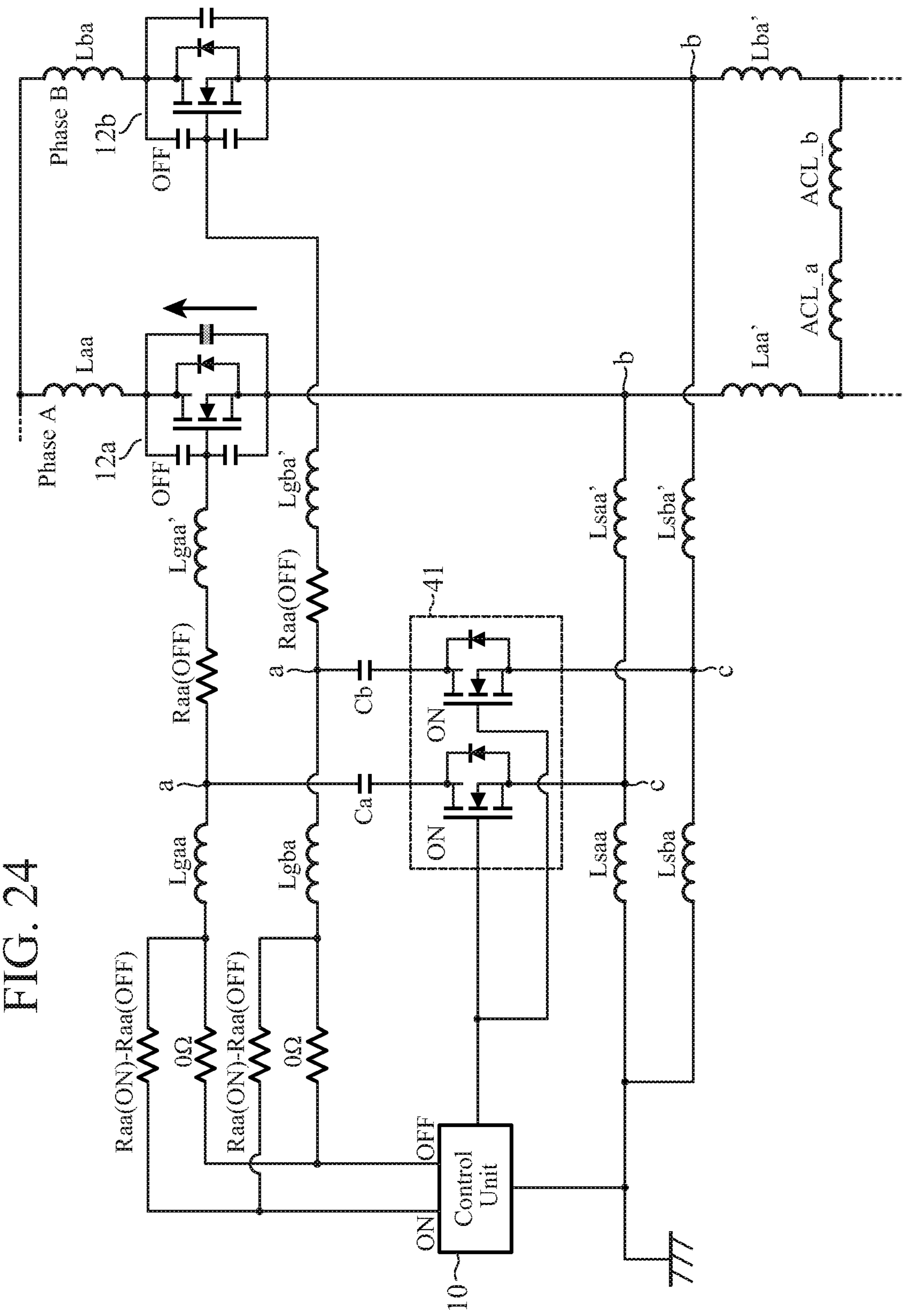
FIG. 24 is a partial circuit diagram illustrating a state in which gate resistances are arranged so that a resonance current flows through a bypass circuit in a power module group included in a second modification of the power conversion device according to the third embodiment.

FIG. 24 is a partial circuit diagram illustrating a state in which gate resistances are arranged so that a resonance current flows through the bypass circuit 41 in the power module group 12 included in a second modification of the power conversion device 1B. In the second modification of the power conversion device 1B, assuming that on/off switching speeds of the power modules 12*a* and 12*b* are different from each other in the second modification of the power conversion device 1B, and switching is performed between the gate resistance Raa(ON) and the gate resistance Raa(OFF) having resistance values different from each other. Here, the gate resistance Raa(ON) is higher in resistance value than the gate resistance Raa(OFF).

As illustrated in FIG. 24, a value of the resistance switched when the control unit 10 sets the power modules 12*a* and 12*b* to the on state is set to Raa(ON)-Raa(OFF), and a value of the resistance switched when the power modules 12*a* and 12*b* are set to the off state is set to 0 ohm. When setting the power modules 12*a* and 12*b* to the on state, the control unit 10 switches the gate resistance to Raa(ON)-Raa (OFF) so that the resonance current $I_1$ flows through the bypass circuit 41. At this time, the resistance of the gate line is expressed by the above formula (1).

The control unit 10 switches the gate resistance to 0 ohm when setting the power modules 12*a* and 12*b* to the off state. At this time, the resistance of the gate line is expressed by the above formula (2). Since the resistances are arranged when the power modules 12*a* and 12*b* are turned on and off, the bypass circuit 41 suppresses the resonance current $I_1$ from flowing into the gate terminals of the power modules 12*a* and 12*b*. At this time, the bypass circuit 41 does not affect the switching speeds of the power modules 12*a* and 12*b*.

Figure 25:
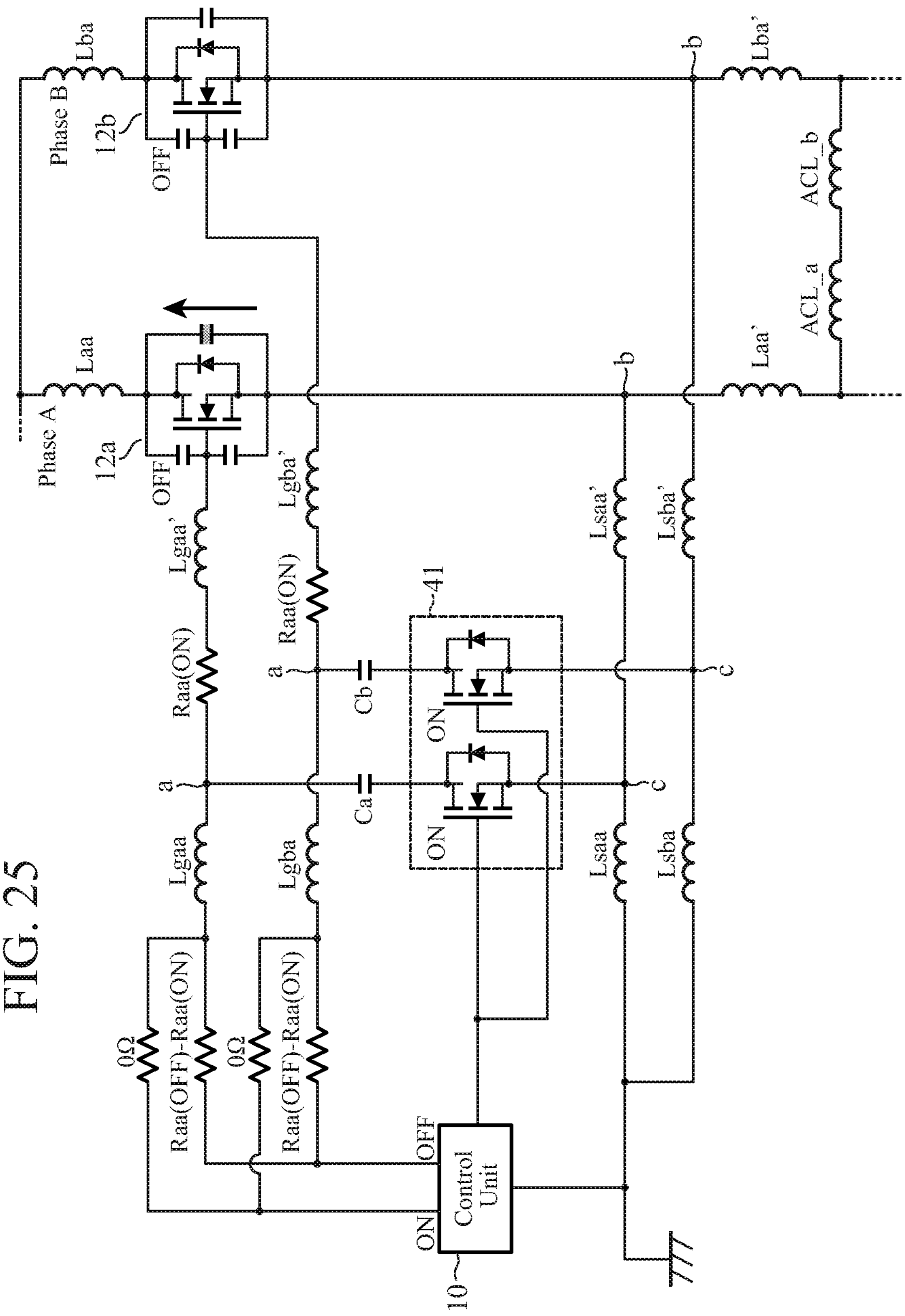
FIG. 25 is a partial circuit diagram illustrating the power module group included in the second modification of the power conversion device according to the third embodiment, in which an arrangement of the gate resistances is changed so that an off gate resistance is higher than an on gate resistance.

FIG. 25 is a partial circuit diagram illustrating the power module group 12 included in the second modification of the power conversion device 1B, in which the arrangement of the gate resistances is changed so that an off gate resistance is higher than an on gate resistance. In the power module group 12 illustrated in FIG. 25, the gate resistance Raa(ON) that is the first resistance element is disposed at the wiring line portion between the first connection point a and the gate terminal of a corresponding one of the power modules 12*a* and 12*b* in the gate line illustrated in FIG. 25.

As illustrated in FIG. 25, a value of the resistance switched when the control unit 10 sets the power modules 12*a* and 12*b* to the off state is set to Raa(OFF)-Raa(ON), and a value of the resistance switched when the power modules 12*a* and 12*b* are set to the on state is set to 0 ohm. The control unit 10 switches the gate resistance to 0 ohm when setting the power modules 12*a* and 12*b* to the on state. At this time, the resistance of the gate line is expressed by the above formula (3).

The control unit 10 switches the gate resistance to Raa (OFF)-Raa(ON) when setting the power modules 12*a* and 12*b* to the off state. At this time, the resistance of the gate line is expressed by the above formula (4). Since the resistances are arranged when the power modules 12*a* and 12*b* are turned on and off, the bypass circuit 41 suppresses the resonance current $I_1$ from flowing into the gate terminals of the power modules 12*a* and 12*b*. At this time, the bypass circuit 41 does not affect the switching speeds of the power modules 12*a* and 12*b*.

Note that, in each embodiment, it is based on the premise that the output of the control unit 10 is separated into the turn-on side and the turn-off side for the circuit configuration in a case where the gate resistances are different from each other between the turn-on side and the turn-off side; however, the present disclosure is not limited to this. For example, the control unit 10 may perform control using one gate line.

As described above, the power conversion device 1B according to the third embodiment includes the capacitors Ca and Cb that are the second capacitors connecting the drain terminals of the semiconductor switching elements of the bypass circuit 41 and the gate terminals of the power modules 12*a* and 12*b*. The semiconductor switching elements of the bypass circuit 41 and the power modules 12*a* and 12*b* have mutually different drive voltages to be applied to the gate terminals. As a result, the power conversion device 1B can cause the resonance current $I_1$ to flow to the bypass circuit 41 side and suppress an increase in the gate voltage.

The power conversion devices according to the first to third embodiments include modifications as described below.

Figure 26:
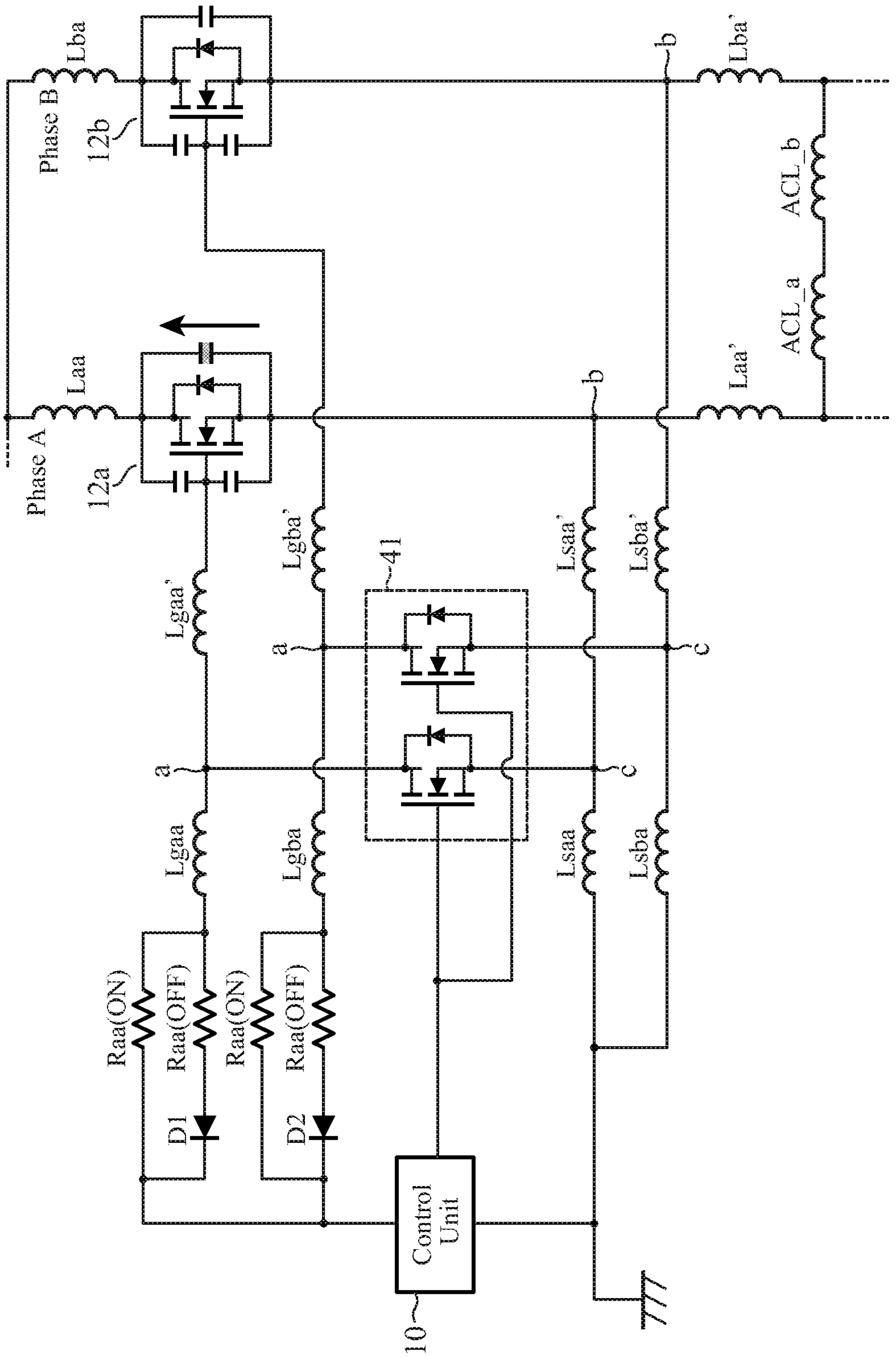
FIG. 26 is a partial circuit diagram illustrating a configuration of a power module group included in a modification A of the power conversion device according to any of the first to third embodiments.

FIG. 26 is a partial circuit diagram illustrating a configuration of the power module group 12 included in a modification A of the power conversion devices 1, 1A, and 1B according to any of the first to third embodiments. As illustrated in FIG. 26, the modification A of the power conversion devices 1, 1A, and 1B includes diodes D1 and D2 provided in gate lines connecting the control unit 10 to the gate terminals of the power modules 12*a* and 12*b*.

For example, the diode D1 is connected in series with the resistance Raa(OFF) on the off side in the gate line with the power module 12*a*. The diode D2 is connected in series with the gate resistance Raa(OFF) on the off side in the gate line with the power module 12*b*. Even if the output from the control unit 10 is single, equivalent effects as those of the power conversion devices 1, 1A, and 1B can be obtained by using the diodes D1 and D2.

Figure 27:
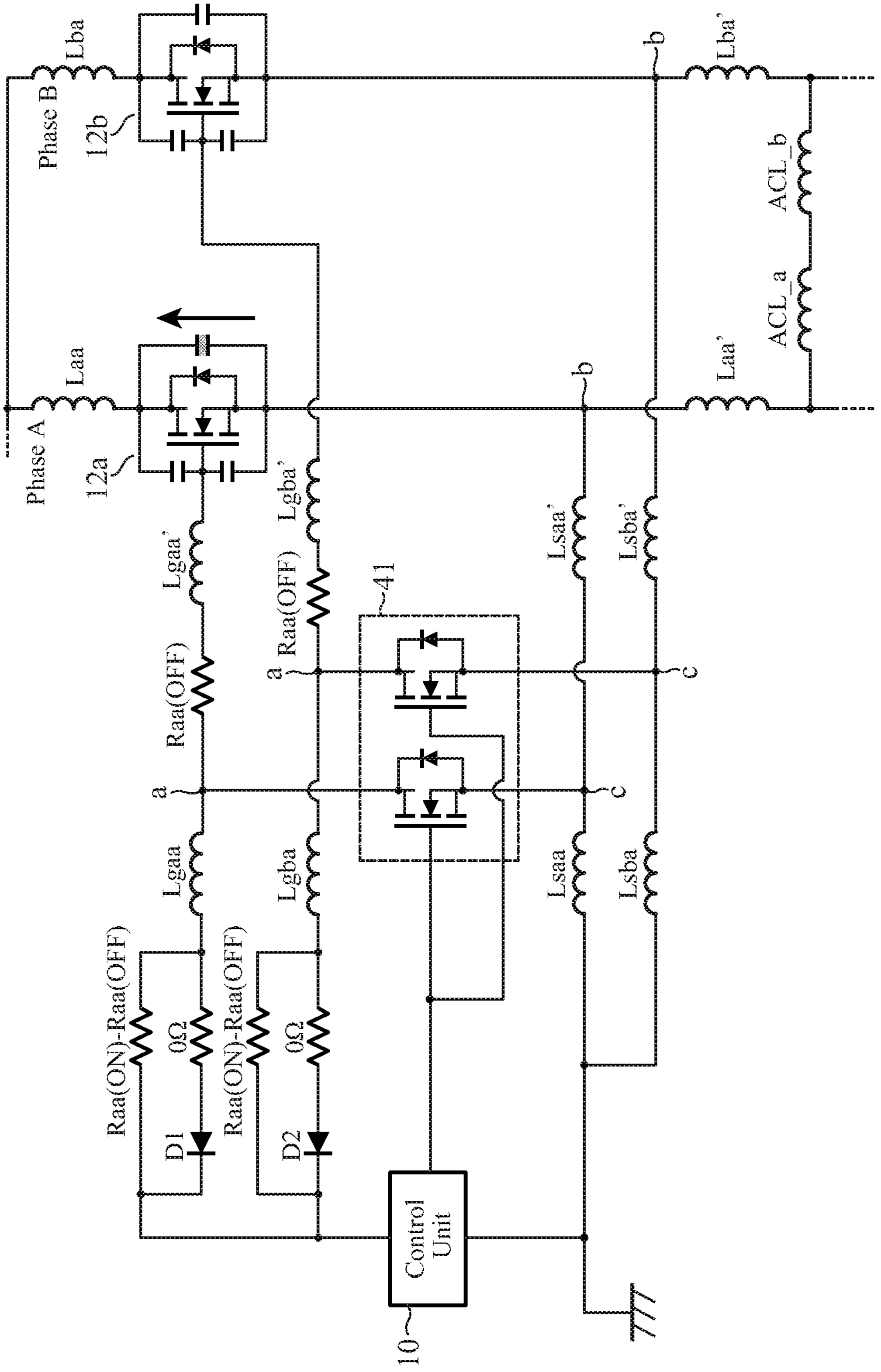
FIG. 27 is a partial circuit diagram illustrating the power module group included in the modification A of the power conversion device according to any of the first to third embodiments, in which an arrangement of gate resistances is changed so that an on gate resistance is higher than an off gate resistance.

FIG. 27 is a partial circuit diagram illustrating the power module group 12 included in the modification A of the power conversion devices 1, 1A, and 1B, in which the arrangement of the gate resistances is changed so that the on gate resistance Raa(ON) is higher than the off gate resistance Raa(OFF).

As illustrated in FIG. 27, a value of the resistance switched when the control unit 10 sets the power modules 12*a* and 12*b* to the on state is set to Raa(ON)-Raa(OFF), and a value of the resistance switched when the power modules 12*a* and 12*b* are set to the off state is set to 0 ohm. When setting the power modules 12*a* and 12*b* to the on state, the control unit 10 switches the gate resistance to Raa(ON)-Raa (OFF) so that the resonance current $I_1$ flows through the bypass circuit 41. At this time, the resistance of the gate line is expressed by the above formula (1).

The control unit 10 switches the gate resistance to 0 ohm when setting the power modules 12*a* and 12*b* to the off state. At this time, switching is performed to the gate lines to which the diodes D1 and D2 are connected. Since the resistances are arranged when the power modules 12*a* and 12*b* are turned on and off, the bypass circuit 41 suppresses the resonance current $I_1$ from flowing into the gate terminals of the power modules 12*a* and 12*b*. At this time, the bypass circuit 41 does not affect the switching speeds of the power modules 12*a* and 12*b*.

Figure 28:
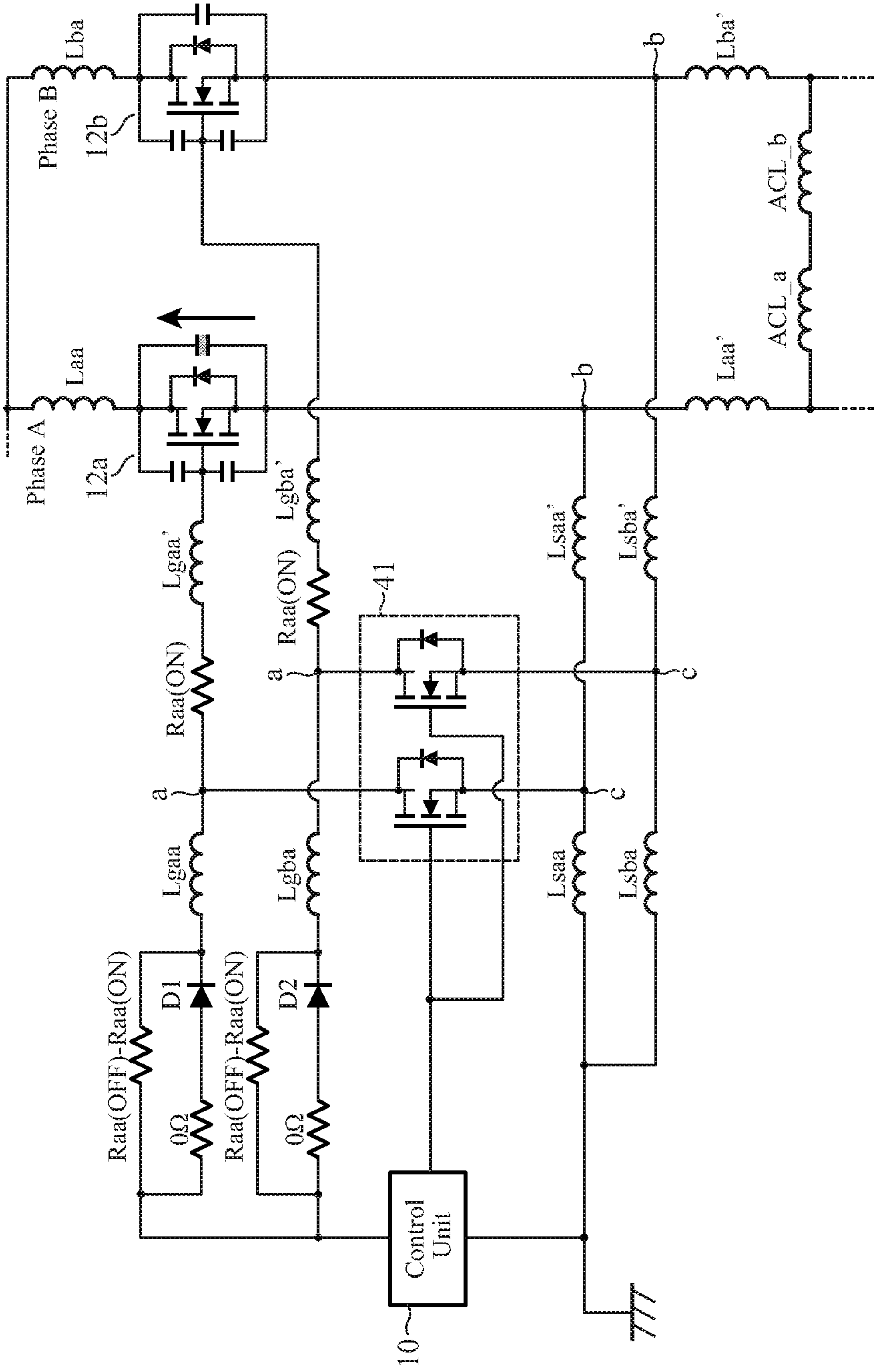
FIG. 28 is a partial circuit diagram illustrating the power module group included in the modification A of the power conversion device according to any of the first to third embodiments, in which the arrangement of the gate resistances is changed so that the off gate resistance is higher than the on gate resistance.

FIG. 28 is a partial circuit diagram illustrating the power module group 12 included in the modification A of the power conversion devices 1, 1A, and 1B, in which the arrangement of the gate resistances is changed so that the off gate resistance Raa(OFF) is higher than the on gate resistance Raa(ON). In the power module group 12 illustrated in FIG. 28, the gate resistance Raa(ON) that is the first resistance element is disposed at the wiring line portion between the first connection point a and the gate terminal of a corresponding one of the power modules 12*a* and 12*b*.

As illustrated in FIG. 28, a value of the resistance switched when the control unit 10 sets the power modules 12*a* and 12*b* to the off state is set to Raa(OFF)-Raa(ON), and a value of the resistance switched when the power modules 12*a* and 12*b* are set to the on state is set to 0 ohm. The control unit 10 performs switching to the gate lines to which the diodes D1 and D2 are connected when setting the power modules 12*a* and 12*b* to the on state.

The control unit 10 switches the gate resistance to Raa (OFF)-Raa(ON) when setting the power modules 12*a* and 12*b* to the off state. At this time, the resistance of the gate line is expressed by the above formula (4). Since the resistances are arranged when the power modules 12*a* and 12*b* are turned on and off, the bypass circuit 41 suppresses the resonance current $I_1$ from flowing into the gate terminals of the power modules 12*a* and 12*b*. At this time, the bypass circuit 41 does not affect the switching speeds of the power modules 12*a* and 12*b*.

Note that the resonance phenomenon due to the potential difference between the power modules is more remarkably occurs as the potential difference is larger. For example, even if the deviation of the recovery timings can be suppressed between the switching timings, if the switching speed (dV/dt) is fast, a potential difference occurs between the power modules even if a slight timing deviation occurs.

For this reason, the power conversion devices 1, 1A, and 1B according to the first to third embodiments exert a remarkable effect by being applied to a power conversion device including power modules that perform switching at a high speed, that is, that are likely to generate a potential difference. For example, in the power modules, a SiC element that is a wide band gap semiconductor is more likely to generate resonance.

Thus, by providing the power conversion devices 1, 1A, and 1B with power modules each being an element generated by using a wide band gap semiconductor, it is possible to suppress the erroneous on due to resonance of the power modules.

The power conversion devices 1, 1A, and 1B according to the first to third embodiments are not limited to the inverter circuits, and may be converter circuits.

In the power conversion devices 1, 1A, and 1B according to the first to third embodiments, the number of chips in the power module package may be one or more.

The power conversion devices 1, 1A, and 1B according to the first to third embodiments are not limited to have the configuration in which two power modules are connected together in parallel in the power module groups 12 to 17, and may have a configuration in which three or more power modules are connected together in parallel.

Note that combination of the embodiments, modification of any components of each of the embodiments, or omission of any components in each of the embodiments are possible.

REFERENCE SIGNS LIST

1, 1A, 1B: power conversion device, 2: DC input power supply, 3: motor, 10: control unit, 11: smoothing capacitor, 12 to 17: power module group, 12*a*, 12*b*, 13*a*, 13*b*: power module, 20: voltage sensor circuit, 21*a* to 21*c*: current sensor circuit, 31*a* to 32*f*: control line, 41: bypass circuit

The invention claimed is:

1. A power conversion device including a plurality of power modules connected together in parallel, the power conversion device comprising:

a controller to switch between an on state in which a terminal pair of each of the power modules is made conductive and an off state in which the terminal pair of each of the power modules is made non-conductive, by supplying a control signal to a control terminal, of the control terminal and the terminal pair of each of the power modules;

a resistance element connected between the controller and the control terminal of each of the power modules; and a bypass circuit including a semiconductor switching element for each of the power modules, and in which one terminal of a terminal pair of the semiconductor switching element is connected to the control terminal of a corresponding one of the power modules and another terminal of the terminal pair of the semiconductor switching element is connected to one terminal of the terminal pair of the corresponding one of the power modules, wherein the controller switches the semiconductor switching element of the bypass circuit to an on state when the corresponding one of the power modules is switched to the off state, thereby reducing a resonance current flowing between the power modules by reducing a current between a first control terminal of a first power module in the off state toward a second control terminal of a second power module in the off state.

2. The power conversion device according to claim 1, further comprising a first capacitor to connect the other terminal of the terminal pair of the semiconductor switching element of the bypass circuit and the one terminal of the terminal pair of the corresponding one of the power modules together, wherein the semiconductor switching element of the bypass circuit and the corresponding one of the power modules have mutually different potentials between terminals connected together via the first capacitor.

3. The power conversion device according to claim 1, further comprising a second capacitor to connect one terminal of the terminal pair of the semiconductor switching element of the bypass circuit and the control terminal of a corresponding one of the power modules together, wherein the semiconductor switching element of the bypass circuit and the corresponding one of the power modules have mutually different drive voltages applied to control terminals.

4. The power conversion device according to claim 1, wherein the controller is connected to the other terminal of the terminal pair of the semiconductor switching element of the bypass circuit, a first connection point between the one terminal of the terminal pair of the semiconductor switching element of the bypass circuit and the control terminal of the corresponding one of the power modules is the first connection point, a second connection point between the other terminal of the terminal pair of the semiconductor switching element of the bypass circuit and the one terminal of the terminal pair of the corresponding one of the power modules is the second connection point, a third connection point between the controller and the other terminal of the terminal pair of the semiconductor switching element of the bypass circuit is the third connection point, and an inductance between the second connection point and the third connection point is smaller than an inductance between the first connection point and the controller and smaller than an inductance between the third connection point and the controller.

5. The power conversion device according to claim 1, wherein a first connection point between the one terminal of the terminal pair of the semiconductor switching element of the bypass circuit and the control terminal of the corresponding one of the power modules is the first connection point, an on-side resistance element provided between the controller and the first connection point and selected when the corresponding one of the power modules is turned on, and an off-side resistance element provided between the controller and the first connection point and selected when the corresponding one of the power module is turned off are included, and the controller sets the corresponding one of the power modules to an on state by supplying the control signal to the control terminal of the corresponding one of the power modules through the on-side resistance element, and sets the corresponding one of the power modules to an off state by supplying the control signal to the control terminal of the corresponding one of the power modules through the off-side resistance element.

6. The power conversion device according to claim 1, wherein each of the power modules is an element generated by using a wide band gap semiconductor.

7. The power conversion device according to claim 1, wherein a first connection point between the one terminal of the terminal pair of the semiconductor switching element of the bypass circuit and the control terminal of the corresponding one of the power modules is the first connection point, and the resistance element is a first resistance element provided between the control terminal of the corresponding one of the power modules and the first connection point.

8. The power conversion device according to claim 7, further comprising:

an on-side resistance element provided between the controller and the first connection point and selected when the corresponding one of the power modules is turned on; and an off-side resistance element provided between the controller and the first connection point and selected when the corresponding one of the power module is turned off, wherein the first resistance element has a resistance value equal to a resistance value of the off-side resistance element, the on-side resistance element has a resistance value that is a difference from the resistance value of the first resistance element, and the off-side resistance element has a resistance value of 0 ohm.

9. The power conversion device according to claim 7, further comprising:

an on-side resistance element provided between the controller and the first connection point and selected when the corresponding one of the power modules is turned on; and an off-side resistance element provided between the controller and the first connection point and selected when the corresponding one of the power module is turned off, wherein the first resistance element has a resistance value equal to a resistance value of the on-side resistance element, the off-side resistance element has a resistance value that is a difference from the resistance value of the first resistance element, and the on-side resistance element has a resistance value of 0 ohm.

10. The power conversion device according to claim 1, wherein the resonance current flows through a conductive channel of a first power module of the power modules, wherein the first control terminal of the first power module is a first gate terminal, wherein the second control terminal of the second power module is a second gate terminal, and wherein the controller switching the semiconductor switching element of the bypass circuit to an on state when the corresponding one of the power modules is switched to the off state causes the resonance current to be reduced at the second gate terminal of the second power module due to being bypassed toward the control unit or toward a ground of the control unit.

11. The power conversion device according to claim 10, wherein each power module is a field effect transistor (FET), and wherein the resonance current is due to different potentials at drain terminals of the respective power modules.

12. The power conversion device according to claim 10, wherein each power module is an insulated gate bipolar junction transistor (IGBT), and wherein the resonance current is due to different potentials at collector terminals of the respective power modules.

* * * * *